US011044647B2

(12) United States Patent
Wang et al.

(10) Patent No.: US 11,044,647 B2
(45) Date of Patent: Jun. 22, 2021

(54) INCREASE IN-SERVICE TIME AND ROBUSTNESS FOR SUSTAINED MOBILITY IN IDLE MODE

(71) Applicant: QUALCOMM Incorporated, San Diego, CA (US)

(72) Inventors: Shanshan Wang, San Diego, CA (US); Yongle Wu, San Diego, CA (US); Gopinath Murali Chinnathambi, San Diego, CA (US); Daniel Amerga, San Diego, CA (US); Huan Xu, San Diego, CA (US); Karthik Venkatram, San Diego, CA (US); Reza Shahidi, San Diego, CA (US); Aziz Gholmieh, Del Mar, CA (US); Andrew Walter Janiszewski, Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/374,596

(22) Filed: Apr. 3, 2019

(65) Prior Publication Data
US 2020/0322856 A1 Oct. 8, 2020

(51) Int. Cl.
*H04B 7/00* (2006.01)
*H04W 36/00* (2009.01)
(Continued)

(52) U.S. Cl.
CPC ... *H04W 36/0079* (2018.08); *H04W 36/0061* (2013.01); *H04W 36/04* (2013.01); *H04W 36/305* (2018.08); *H04W 76/10* (2018.02)

(58) Field of Classification Search
CPC ... H04W 48/20; H04W 36/32; H04W 64/006; H04W 36/04; H04W 36/24;
(Continued)

(56) References Cited

U.S. PATENT DOCUMENTS

2004/0082328 A1* 4/2004 Japenga ............... H04W 36/30
455/436
2006/0258386 A1* 11/2006 Jeong .................. H04W 36/24
455/525
(Continued)

FOREIGN PATENT DOCUMENTS

WO 2019034996 A1 2/2019

OTHER PUBLICATIONS

3GPP TS25.304 v1.0.0 (Apr. 1999) "3rd Generation Partnership Project (3GPP); Technical Specification Group (TSG) RAN; Working Group 2 (WG2); UE Procedures in Idle Mode", pp. 1-29.
(Continued)

*Primary Examiner* — Jung Liu
(74) *Attorney, Agent, or Firm* — Haynes and Boone, LLP

(57) ABSTRACT

Wireless communications systems and methods related to user equipment (UE) idle mode mobility in a wireless communication network are provided. A wireless communication device establishes a network session with a wireless communication network. The wireless communication device reselects a first cell for camping, wherein the first cell is associated with the wireless communication network. The wireless communication device monitors for first system information from the first cell. The wireless communication device reselects a second cell for camping in response to a failure to receive the first system information. The second cell is associated with the wireless communication network and different from the first cell. The wireless communication device maintains the network session during the reselecting the first cell for camping and the reselecting the second cell for camping.

30 Claims, 10 Drawing Sheets

(51) Int. Cl.
*H04W 76/10* (2018.01)
*H04W 36/30* (2009.01)
*H04W 36/04* (2009.01)

(58) Field of Classification Search
CPC ...... H04W 84/042; H04W 72/04; H04B 7/00; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | |
|---|---|---|---|
| 2009/0117905 A1* | 5/2009 | Watanabe | H04W 48/20 455/437 |
| 2012/0264435 A1 | 10/2012 | Rangaiah et al. | |
| 2013/0189993 A1* | 7/2013 | Han | H04W 36/08 455/437 |
| 2014/0146794 A1 | 5/2014 | Dalsgaard | |
| 2018/0084469 A1 | 3/2018 | Namboodiri et al. | |
| 2020/0322863 A1 | 10/2020 | Wang et al. | |

OTHER PUBLICATIONS

Email Discussion Rapporteur (Ericsson): "[89 #20] [LTE-L23] SIB Acquisition Failure (Ericsson) Email Discussion Report", 3GPP TSG-RAN WG2 #89bis, 3GPP Draft; R2-151677 WAS R2-151368 Sibreadfailureemaildiscreportrev1, 3rd Generation Partnership Project (3GPP), Mobile Competence Centre; 650, Route Des Lucioles; F-06921 Sophia-Antipolis Cedex, vol. RAN WG2, No. Bratislava, Slovakia; Apr. 20, 2015-Apr. 24, 2015, Apr. 19, 2015 (Apr. 19, 2015), pp. 1-14, XP050936580.

International Search Report and Written Opinion—PCT/US2020/026449—ISA/EPO—dated Jul. 6, 2020.

Samsung: "On Demand SI: Further Details of MSG1 Approach", 3GPP TSG-RAN WG2 Meeting #98 3GPP Draft; R2-1704049_On Demand SI_MSG1 Approach Details, 3rd Generation Partnership Project (3GPP), Mobile Competence Centre, 650, Route Des Lucioles, F-06921, Sophia-Antipolis Cedex, France, vol. RAN WG2, No. Hangzhou, China; May 15, 2017-May 19, 2017, May 14, 2017, 6 Pages, XP051274662.

* cited by examiner

INCREASE IN-SERVICE TIME AND ROBUSTNESS FOR SUSTAINED MOBILITY IN IDLE MODE

TECHNICAL FIELD

This application relates to wireless communication systems, and more particularly to user equipment (UE) idle mode mobility in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Maintaining mobility is important in a wireless communication network, where a UE may travel from one coverage area or cell to another coverage area or cell. In general, a UE may be in an idle state or a connected state with respect to a network. An idle mode UE is not attached to any BS and there are no network and/or radio resources allocated to the UE. The UE's location is known to the network, for example, within a group of cells referred to as a tracking area. While a UE is not attached to any BS, the UE is required to select a suitable cell to camp on. The procedure of a UE selecting and camping on a cell is referred to as cell selection. While camping on a cell, the UE continues to monitor other cells. When the UE detects a degradation in the received signal quality from the currently camped cell, for example, due to mobility, the UE may decide to camp on another cell. The procedure of evaluating and reselecting another cell while the UE is currently camped on a serving cell is referred to as cell reselection.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising establishing, by a wireless communication device, a network session with a wireless communication network; reselecting, by the wireless communication device, a first cell for camping, wherein the first cell is associated with the wireless communication network; monitoring, by the wireless communication device, for first system information from the first cell; reselecting, by the wireless communication device, a second cell for camping in response to a failure to receive the first system information, wherein the second cell is associated with the wireless communication network and different from the first cell; and maintaining, by the wireless communication device, the network session during the reselecting the first cell for camping and the reselecting the second cell for camping.

In an additional aspect of the disclosure, an apparatus comprising a processor configured to establish a network session with a wireless communication network; reselect a first cell for camping, wherein the first cell is associated with the wireless communication network; monitor for first system information from the first cell; reselect a second cell for camping in response to a failure to receive the first system information, wherein the second cell is associated with the wireless communication network and different from the first cell; and maintain the network session during the reselecting the first cell for camping and the reselecting the second cell for camping.

In an additional aspect of the disclosure, a non-transitory computer-readable medium having program code recorded thereon, the program code comprising code for causing a wireless communication device to establish a network session with a wireless communication network; code for causing the wireless communication device to reselect a first cell for camping, wherein the first cell is associated with the wireless communication network; code for causing the wireless communication device to monitor for first system information from the first cell; code for causing the wireless communication device to reselect a second cell for camping in response to a failure to receive the first system information, wherein the second cell is associated with the wireless communication network and different from the first cell; and code for causing the wireless communication device to maintain the network session during the reselecting the first cell for camping and the reselecting the second cell for camping.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
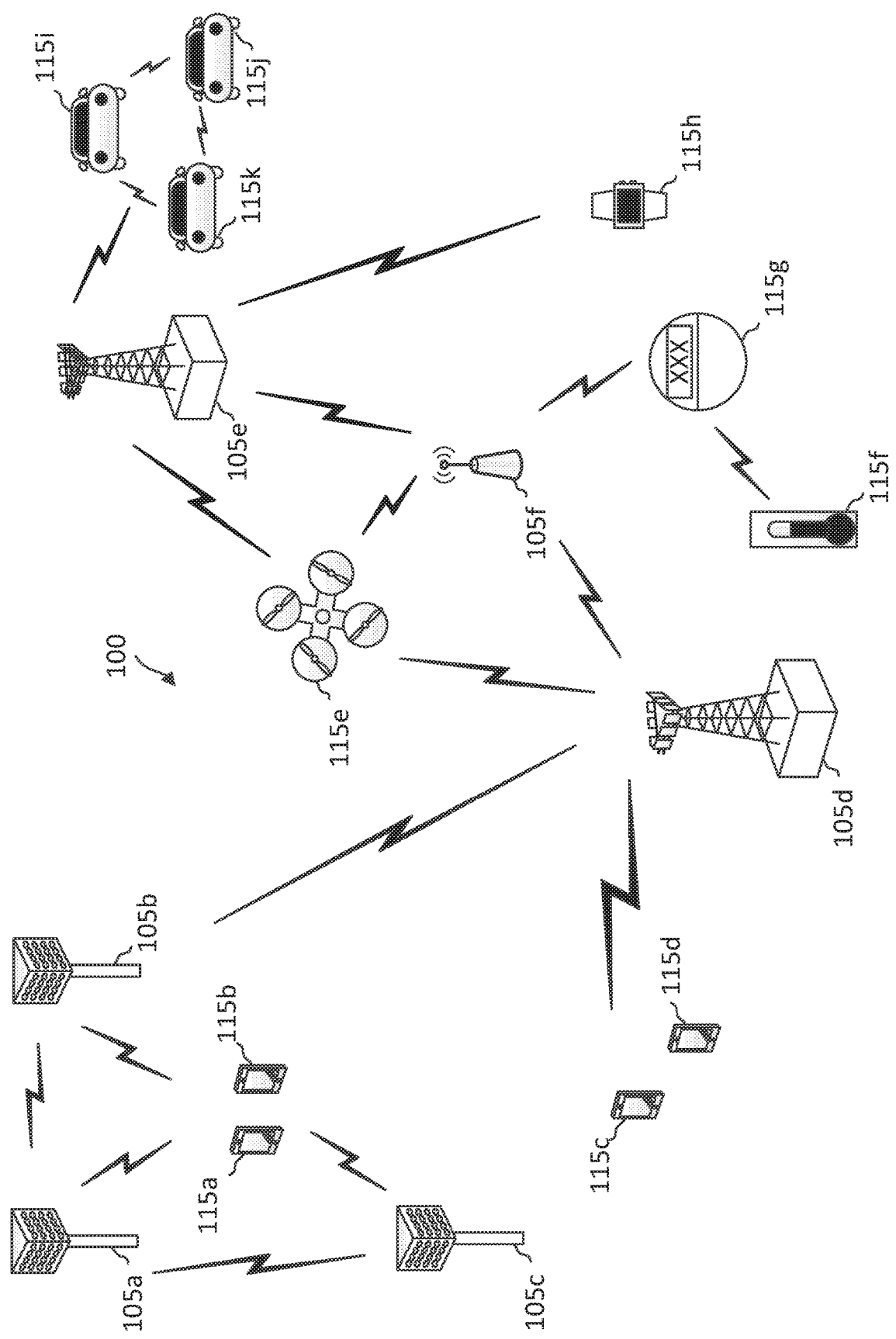
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS may broadcast system information, for example, in the form of master information block (MIB) and system information blocks (SIBs). The system information includes essential or critical information, such as downlink (DL) channel configuration information, uplink (UL) channel configuration information, and access class information or cell barring information, for a UE to access the network. Certain system information may be more important or critical than others for network access. Without a successful reception of the important or critical system information, the UE may not be able to continue to camp on a cell.

In some instances, a UE may attempt to camp on a cell continually having a poor DL radio signal condition. Thus, the UE may be unable to receive all the critical system information for a long period of time. In order to avoid trying to receive the critical system information indefinitely, the UE may utilize certain timers to terminate the monitoring of the critical system information. Upon expiration of the timers, UE may go out of service (OOS) and restart a cell selection to find a suitable cell for camping. Similarly, in some examples, when the UE fails to receive non-critical system information within a certain time limit, the UE may also declare OOS and restart a cell selection. While the timeout mechanisms allow the UE to stop monitoring for system information, the restarting of a cell selection can be time consuming and power consuming. In addition, the declaring of the OOS can cause the UE to miss paging and/or calls.

The present application describes mechanisms for a UE to increase in-service time and improve idle mode mobility robustness. For example, a UE performs an initial cell selection to select a suitable cell for camping in a network. After selecting a suitable or serving cell, the UE performs a network attachment procedure to establish a network session with the network. The UE monitors and evaluates signal measurements from the serving cell and neighboring cells while camping on the serving cell. The UE may select another cell for camping (e.g., due to mobility) and monitor for system information from the selected cell. In the disclosed embodiments, upon failing to camp on the selected cell due to a failure to receive certain system information from the selected cell, the UE performs a fast cell reselection instead of declaring OOS and restarting a time-consuming and/or power-consuming initial cell selection procedure as in a conventional UE procedure. In other words, the fast cell reselection is initiated based on a system information reception failure instead of based on cell signal measurements as in a conventional cell reselection procedure. In addition, the UE can reselect to another cell without having to monitor signal measurements from the cell for a certain duration and ensuring that the cell is better than the serving cell for the duration before the reselection, and thus providing a fast or immediate cell reselection. Further, the network session is maintained while the UE performs the fast cell reselection, and thus can increase the amount of time the UE is in service and reduces missed calls for the UE.

In an embodiment, during the fast cell reselection, the UE selects a highest priority cell from among neighboring cells that satisfy certain cell reselection criteria. For example, the cell reselection criteria may require the neighboring cells to have signal measurements higher than signal measurements of the serving cell. When there are multiple neighboring cells with the same priority satisfying the cell reselection criteria, the UE selects the cell with signal measurements satisfying the cell reselection criteria for the longest duration or the cell with the highest signal strength.

In an embodiment, when the UE determines that there is no neighboring cell satisfying the cell reselection criteria at the time of the fast cell reselection, the UE performs a one-shot signal measurement for each available neighboring cell. In some instances, when no inter-frequency/inter-RAT neighboring lists were received (due to SIB reception failure), the UE may search for neighboring cells on the serving frequency. Alternatively, the UE may determine available neighboring cells by searching databases of neighboring cells collected based on cell monitoring history and/or geographical location information of the UE and neighboring cells. The UE selects the cell with the highest priority and the highest signal measurement based on the one-shot measurements. In an embodiment, when the neighboring cells are mmWav cells, the UE performs signal measurements in a plurality of beam directions and selects the cell having the largest number of beams with signal measurements above a certain threshold.

In an embodiment, the UE restricts the amount of time or the number of attempts that the UE can perform a fast cell reselection, for example, by utilizing a combination of timers and counters. The UE can configure a maximum allowable time duration and/or a maximum allowable number of attempts for fast cell reselection based on a critical level of the missing or failed system information. For example, the UE can allow for a longer duration and/or a greater number of retries for fast cell reselections when the missing or failed system information is less critical. Additionally, the UE may exclude a candidate cell from a subsequent cell selection or cell reselection if there are multiple past or present critical and/or non-critical system information reception and/or decoding failures from the candidate cell.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT), and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a MIB, remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as a access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs), which may also be referred to as routing notification areas (RNAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115. When the UE 115 has no active data communication with the BS 105 after the network attachment, the UE 115 may return to an idle state (e.g., an RRC idle state). During an idle state, the UE 115 may perform channel measurements, perform cell reselection, update TA/RNA location, and/or monitor a paging channel. Mechanisms for performing initial cell selection and cell reselection are described in greater detail herein.

Figure 2:
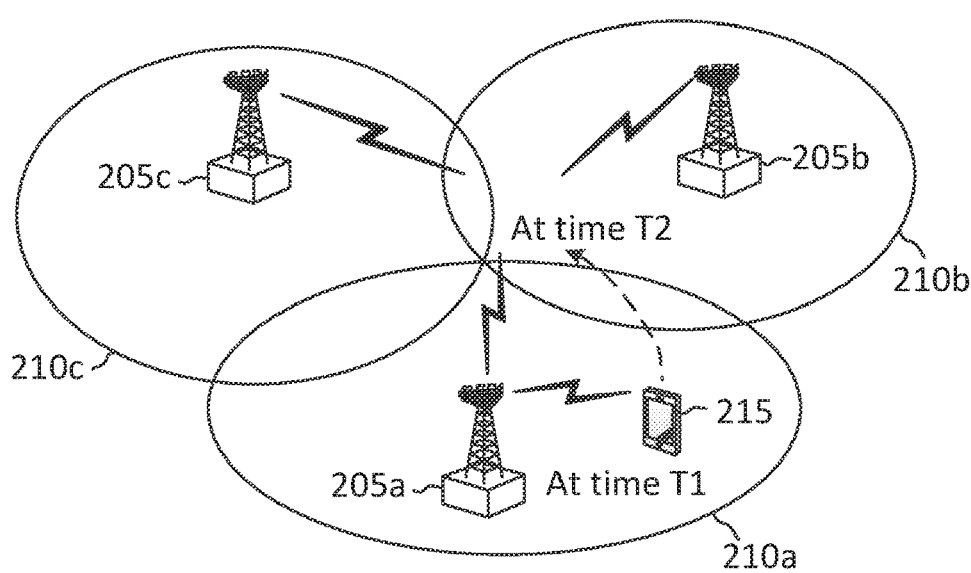
FIG. 2 illustrates a wireless communication network according to some embodiments of the present disclosure.
Figure 3:
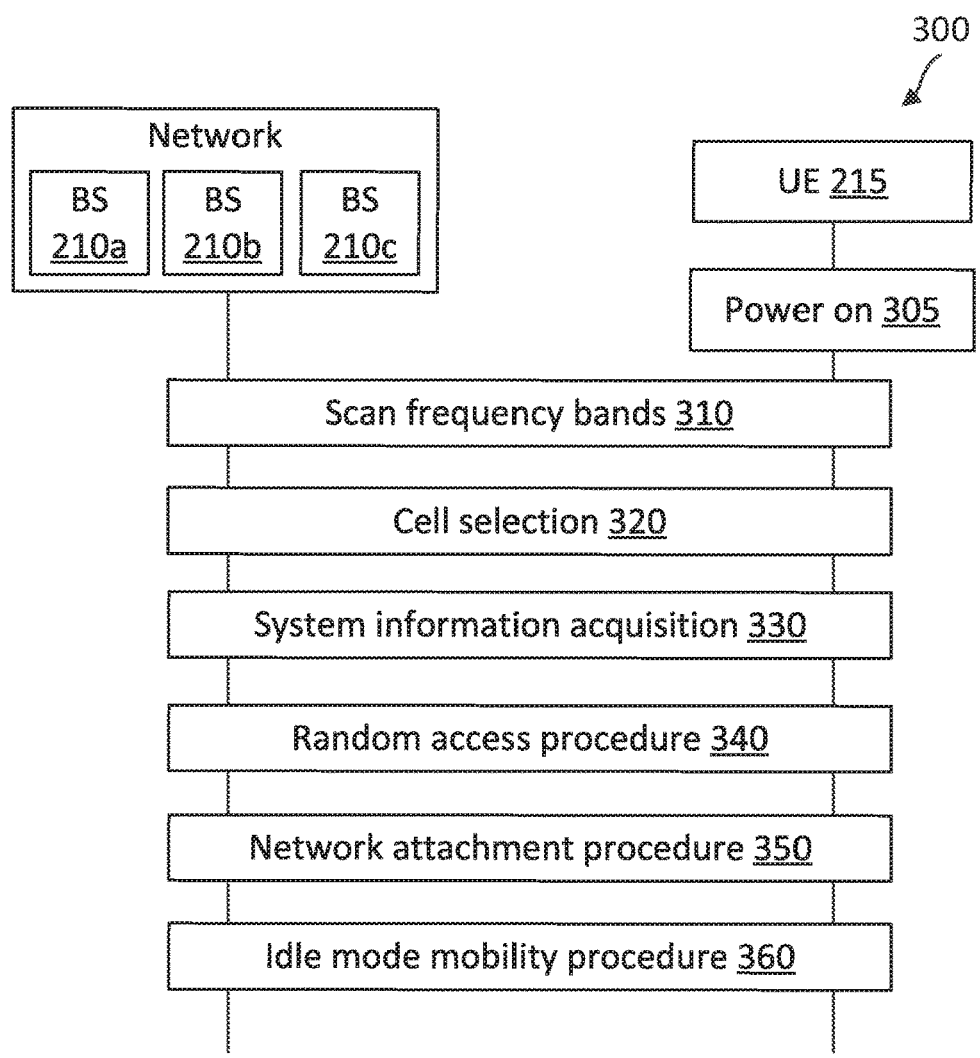
FIG. 3 is a signaling diagram illustrating a cell selection and cell reselection method according to embodiments of the present disclosure.

FIGS. 2 and 3 illustrate an initial cell selection and cell reselection scenario. FIG. 2 illustrates a wireless communication network 200 according to some embodiments of the present disclosure. The network 200 may correspond to a portion of the network 100. FIG. 2 illustrates three BSs 205 (individually labeled as 205a, 205b, and 205c), three cells 210 (individually labeled as 210a, 210b, and 210c), and one UE 215 for purposes of simplicity of discussion, though it will be recognized that embodiments of the present disclosure may scale to many more UEs 215 and/or BSs 205. The BSs 205 are similar to the BSs 105. The UE 215 is similar to the UEs 115. The BS 205a provides service in a coverage area or cell 210a. The BS 205b provides service in a coverage area or cell 210b. The BS 205c provides service in a coverage area or cell 210c.

As an example, at time T1, the UE 215 is activated when the UE 215 is in the coverage of the cell 210a. The UE 215 performs an initial cell selection procedure and camp on the cell 210a based on channel measurements and certain selection criteria. While camping on the cell 210a, the UE 215 may search for a better cell 210 to camp on, for example, due to mobility of the UE 215 (at time T2) as shown by the dashed arrow. Mechanisms for performing initial cell selection and cell reselection (e.g., mobility in idle mode) are described in greater detail herein.

FIG. 3 is a signaling diagram illustrating an initial cell selection and cell reselection method 300 according to embodiments of the present disclosure. The method 300 is employed by the network 200. The method 300 is implemented by the UE 215 and the BSs 205a, 205b, and 205c. Steps of the method 300 can be executed by computing devices (e.g., a processor, processing circuit, and/or other suitable component) of the BS 205a, 205b, and 205c and the UE 215. The BSs 205a, 205b, and 205c may be referred to as a network. The network may further include core network components, such as SGW, 5GC, and AMF entities. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 305, the UE 215a is powered on from a power-off state. For example, the UE 215a is being activated while positioned in the coverage area of the cell 210a at time T1 as shown in FIG. 2.

At step 310, after transitioning from the power-off state to the power-on state, the UE 215a scans a list of available radio frequency (RF) bands or channels. During the frequency scan, the UE 215a measures receive signal quality (e.g., received signal strength indicator (RSSI)) for each detected cell (or BSs 205a, 205b, and 205c) on the frequency bands. For example, the BSs 205a, 205b, and 205c may broadcast PSSs, SSSs, system information (e.g., MIBs and SIBs), and/or reference signals for respective cells 210. and the UE 215a may determine receive signal quality from the broadcast signals. In some instances, the BSs 205a, 205b, 205c may operate in different frequency bands. In some other instances, the BSs 205a, 205b, 205c may operate in the same frequency band. In some instances, the BSs 205a, 205b, 205c may use different radio access technologies (RATs), for example, including LTE and 5G NR. In some other instances, the BSs 205a, 205b, 205c may use the same RAT. The UE 215a may select candidate cells or BSs 205 that provide receive signal quality greater than a certain threshold. The UE 215a may synchronize to each candidate cell and decode broadcast information (e.g., physical cell identity (PCI), public land mobile network (PLMN), TAU information) from the candidate cell.

At step 320, the UE 215a performs a cell selection. The UE 215a may select a suitable cell based on the cell information received from the frequency scan. The UE 215a may select a cell that belongs to a certain PLMN (e.g., a registered PLMN), not barred from access, belongs to at least one TA that is not forbidden, and/or satisfies certain cell selection criteria (e.g., satisfying certain reference signal received power (RSRP) and/or reference signal received quality (RSRQ) requirements). For example, the UE 215a may select the cell 210a served by the BS 205a. The selected cell 210a may be referred to as the serving cell or source cell for the UE 215a. The scanning of available frequency bands at step 310 and the cell selection step 320 may be generally refer to as an initial cell selection.

At step 330, after selecting the cell 210a, the UE 215a may continue to acquire system information from the selected cell 210a.

At step 340, the UE 215a performs a random access procedure with the BS 205a. For example, the UE 215a may exchange a random access preamble, a random access response, a RRC connection request, and a RRC connection response with the BS 205a as described above.

At step 350, after completing the random access procedure and establishing an RRC connection with the network, the UE 215a initiates a network attachment procedure with the network. For example, the BS 205a may coordinate with the core network components to identify, authenticate, and authorize the UE 215 for sending and/or receiving data in the network and assign the UE 215a with a group of TAs as described above. Once the network attachment procedure succeeds, a context is established for the UE 215a in the network. When the network attachment procedure is completed, a network session is established between the network and the UE 215a. If the UE 215a has no data to send or receive after the network session is established, the UE 215a may transition to an RRC idle mode and camp on the cell 210a.

At step 360, the UE 215a performs an idle mode mobility procedure. While camping on the cell 210a, the UE 215a may monitor and evaluate receive signal power or quality from the serving cell 210a (e.g., the BS 205a). When the RSRP or the RSRQ from the serving cell 210a falls below a certain threshold, the UE 215a may monitor or evaluate receive signal power or quality from neighboring cells (e.g., the cells 210b and 210c) to search for a better cell for camping. In an example, the UE 215a may identify neighboring cells based on system information received from a previous cell search, or a previously camped cell, and/or monitoring from the current serving cell 210a.

As described above, a BS may broadcast system information (e.g., MIBs and SIBs) to enable a UE to access the network. In an example, a SIB type one (SIB1) provides scheduling information and/or availability of other SIB types and/or information (e.g., PLMN information and/or cell barring information) that can guide a UE in performing cell selection and/or cell reselection. For example, the UE 215a may search for a suitable cell based on SIB1 information received from the BS 205a.

Some examples for the other SIB types may include a SIB type two (SIB2), a SIB type three (SIB3), a SIB type four (SIB4), and a SIB type five (SIB5). A SIB2 provides information for cell reselection that are common for inter-frequency cell reselection, intra-frequency cell reselection, and inter-radio access technology (inter-RAT) cell reselection. For example, a SIB2 may include measurement thresholds for a UE to determine when to start searching for another cell, cell priorities for cell reselection, and/or various cell reselection criteria and/or thresholds. A SIB3 provides neighboring cell related information for intra-frequency cell reselection. For example, the SIB3 includes physical cell identifier (ID) information associated with an intra-frequency neighboring cell and/or corresponding criteria for cell reselection. A SIB4 provides neighboring cell related information for inter-frequency cell reselection. For example, the SIB4 includes physical cell ID, frequency carrier, frequency band, and/or beam information associated with an inter-frequency neighboring cell and/or corresponding criteria for cell reselection. A SIB5 provides neighboring cell related information for inter-RAT cell reselection. For example, the SIB5 includes RAT, frequency carrier, frequency band, and/or beam information associated with an inter-RAT neighboring cell and/or corresponding criteria for cell reselection. An example of an inter-RAT cell reselection may include a UE camped on an NR cell and reselecting to camp on an LTE cell or camping. Alternatively, a UE camped on an LTE cell may reselect to camp on an NR cell. In some instances, an inter-RAT cell reselection may be based on UE's preferences.

In an example, when the cell 210b is an intra-frequency neighboring cell of the cell 210a, the SIB3 may include information to guide a UE 215 to reselect to the cell 210b. Alternatively, when the cell 210b is an inter-frequency neighboring cell of the cell 210a, the SIB4 may include information to guide a UE 215 to reselect to the cell 210b. Yet alternatively, when the cell 210b is an inter-RAT neighboring cell of the cell 210a, the SIB5 may include information to guide a UE 215 to reselect to the cell 210b.

In an example, the UE 215 may move away from the camped cell 210a. The UE 215 may start to search for another cell for camping when the measured received signal power and/or the received signal quality from the currently camped cell 210a falls below a certain threshold. During the search, the UE 215 may measure received signal power and/or received signal quality from the currently camped cell 210a and other candidate cells (e.g., the cells 210b and 210c) which are qualified to be considered for cell reselection. For example, a candidate cell may not be a blacklisted cell or a cell barred from access. The UE 215 may rank the candidate cells based on certain ranking rules or cell reselection priorities associated with the candidate cells in addition to the channel measurements. When the received signal power and/or the received signal quality measured from any of the qualified cells becomes better than the currently camped cell 210a by a certain amount (e.g., based on a hysteresis) and remains better than the currently camped cell 210a for a predefined time duration, the UE 215 changes to camp on the better cell.

The UE 215 may autonomously make the cell camping decision based on cell reselection criteria based on system information received from the serving cell BS 205a. In an example, a SIB2 can include an s-IntraSearchP threshold, an s-IntraSearchQ threshold, an s-NonIntraSearchP threshold, and/or an s-NonIntraSearchQ threshold for beginning a cell search. For example, when the received signal power of the currently camped cell falls below the s-IntraSearchP threshold and/or when the received signal quality of the currently camped cell falls below the s-IntraSearchQ threshold, the UE 215 may search and/or monitor for an intra-frequency candidate cell. When the received signal power of the currently camped cell falls below the s-NonIntraSearchP threshold and/or when the received signal quality of the currently camped cell falls below the s-NonIntraSearchQ threshold, the UE 215 may search and/or monitor for an inter-frequency candidate cell or an inter-RAT candidate cell. SIB2 can also include a threshServingLowQ threshold for triggering a new cell to be reselected, a q-Hyst parameter for the hysteresis, a Qoffset parameter for ranking intra-frequency neighboring cells, and/or a t-Reselection timer parameter for the predefined time duration. SIB2 can further include various measurement parameters, such as the number of SSBs to measure or average for the channel measurements, the beam indices and/or corresponding thresholds, cell reselection priorities, and/or any other related cell reselection configuration parameters as described in the 3GPP document TS 38.331 Release 15, titled "$3^{rd}$ Generation Partnership Project; Technical Specification Group Radio Access Network; NR; Radio Resource Control (RRC) protocol specification," Jan. 14, 2019, which is incorporated herein by reference.

Referring to the example shown in FIG. 2, the UE 215 travels away from the cell 210a towards the cell 210b. At time T2, the UE 215 is closer to BS 205b than the BSs 205c, and thus may receive a stronger received signal quality and/or a stronger received signal power from the BS 205b than the BSs 205a and 205c. The UE 215 may reselect the cell 210b for camping based on the channel measurements and cell reselection parameters/criteria included in the system information received from the BS 205a.

After reselecting to camp on the cell 210b, the UE 215a may acquire system information from the cell 210b. The UE 215a may wait to receive MIBs and/or SIBs from the BS 205b. The UE 215a may configure various timers for reading MIBs and/or SIBs from the BS 205b. When the timers for reading the MIBs and/or SIB s expire, the UE 215a may determine that the UE 215a is OOS. For example, the UE may report an OOS error to an upper layer (e.g., a network access stratum (NAS) layer), which may in turn terminate the network session and initiate an initial cell selection procedure at the UE. In other words, the UE may return to perform the steps of 310 to 350 as shown in the method 300, where frequency scanning, cell selection, and network attachment are performed. Accordingly, the declaring of an OOS upon a failure to receive certain system information can be time consuming and can increase power consumption at the UE. In addition, the declaring of the OOS can cause the UE to miss calls when the UE is performing the initial cell selection.

Accordingly, the present disclosure provides techniques for a UE to reselect to a different cell upon a failure to receive certain system information from a selected cell instead of declaring OOS and restarting an initial cell selection. In other words, the UE may quickly reselect to another cell upon a failure to receive certain system information from a currently camped cell while maintaining the same network session. The present disclosure may allow a UE to retry the fast cell reselections for a certain amount of time or a certain number of attempts before declaring an OOS. Thus, the present disclosure can delay and reduce the occurrences of OOS errors. Accordingly, the present disclosure can increase the UE's in-service time and improve idle mode mobility robustness.

Figure 4:
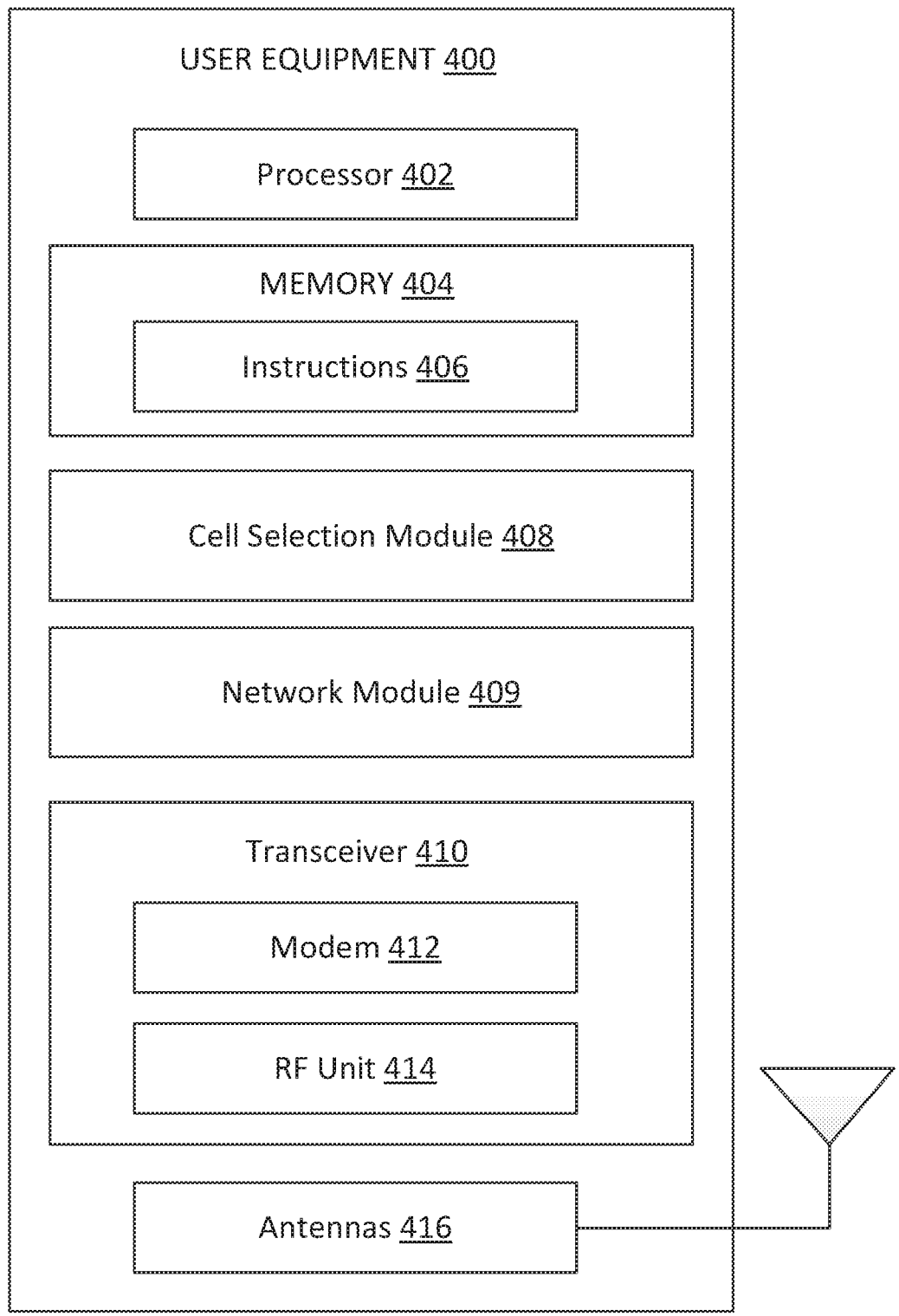
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 in the network 100 or a UE 215 in the network 200 as discussed above. As shown, the UE 400 may include a processor 402, a memory 404, a cell selection module 408, a network module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 3 and 6-11. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the cell selection module 408 and the network module 409 may be implemented via hardware, software, or combinations thereof. For example, each of the cell selection module 408 and the network module 409 may be implemented as a processor, circuit, and/or instructions 406 stored in the memory 404 and executed by the processor 402. In some examples, the cell selection module 408 and the network module 409 can be integrated within the modem subsystem 412. For example, the cell selection module 408 and the network module 409 can be implemented by a combination of software components (e.g., executed by a DSP or a general processor) and hardware components (e.g., logic gates and circuitry) within the modem subsystem 412. In some examples, a UE may include one of the cell selection module 408 and the network module 409. In other examples, a UE may include both the cell selection module 408 and the network module 409.

The cell selection module 408 and the network module 409 may be used for various aspects of the present disclosure, for example, aspects of FIGS. 3 and 6-11. The cell selection module 408 is configured to perform frequency scanning upon a power-up of the UE 400, monitor for system information (e.g., PSS, SSS, PBCH, MIB, SIBs, RMSI, OSI, and/or SSBs) from one or more BSs (e.g., one or more of the BSs 105 and 205) in a network (e.g., the network 100 or 200), search for a suitable cell for camping based on cell information identified from the monitoring, perform a random access procedure with the BS of a selected cell, establish a network session with the network by coordinating with the network module 409, and/or track and maintain cell information received from the monitoring, and/or perform idle mode mobility. The cell selection module 408 is further configured to performs the idle mode mobility by evaluating signal measurements from a serving cell and neighboring cells while camping on the serving cell, performing cell reselection based on the signal measurements, performing a fast cell reselection upon failing to receive certain system information from a reselected cell, maintaining a network session while performing a fast cell reselection (e.g., without declaring an OOS error), configuring a timer and/or a counter to restrict the amount of time or the number of attempts for fast cell reselection, and/or reporting an OOS error to the network module 409 when the time duration and/or the number of attempts allowed for fast cell reselection are being exceeded, as described in greater detail herein.

The network module 409 is configured to implement various network layer functions. For example, the network module 409 is configured to perform a network attachment procedure with the network to establish a network session (e.g., subsequent to an initial cell selection), monitor for an OOS error from the cell selection module 408, terminate a network session upon receiving an OOS error from the cell selection module 408, and/or initiate an initial cell selection upon an OOS error, as described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the cell selection module 408, and/or the network module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement RATs.

Figure 5:
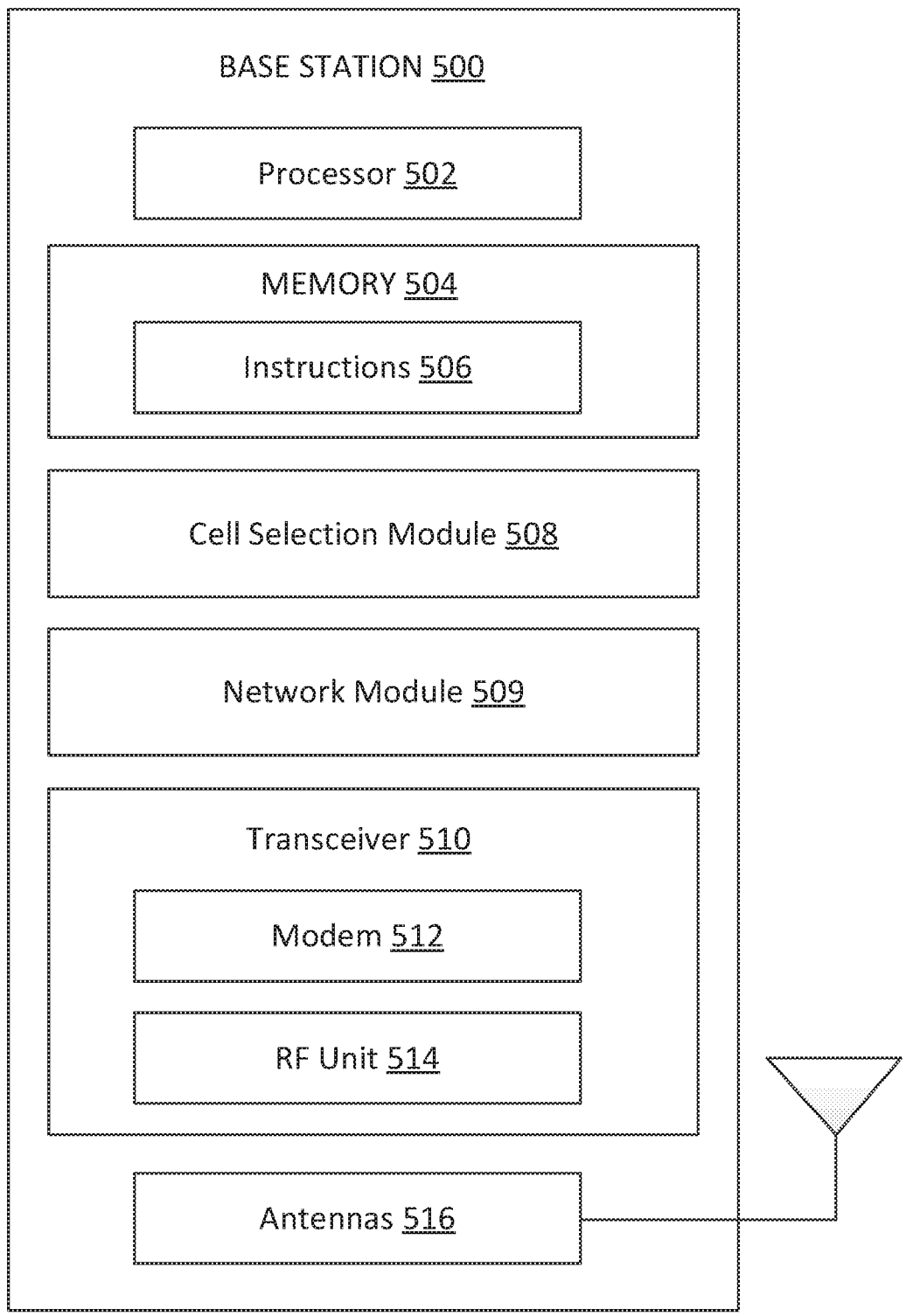
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 in the network 100 or a BS 205 in the network 200 as discussed above. A shown, the BS 500 may include a processor 502, a memory 504, a system information module 508, a network module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 3 and 6-11. Instructions 506 may also be referred to as code, which may be interpreted broadly to include any type of computer-readable statement(s) as discussed above with respect to FIG. 4.

Each of the system information module 508 and the network module 509 may be implemented via hardware, software, or combinations thereof. For example, each of the system information module 508 and the network module 509 may be implemented as a processor, circuit, and/or instructions 506 stored in the memory 504 and executed by the processor 502. In some examples, the system information module 508 and/or the network module 509 can be integrated within the modem subsystem 512. For example, the system information module 508 and/or the network module 509 can be implemented by a combination of software components (e.g., executed by a DSP or a general processor) and hardware components (e.g., logic gates and circuitry) within the modem subsystem 412. In some examples, the network module 509 may coordinate mobility and network attachment functionalities with a core network in communication with the BS 500 as described herein. In some examples, a BS may include one of the system information module 508 or the network module 509. In other examples, a BS may include both the system information module 508 and the network module 509.

The system information module 508 and the network module 509 may be used for various aspects of the present disclosure, for example, aspects of FIGS. 3 and 6-11. The system information module 508 is configured to transmit broadcast system information periodically according to certain schedules to enable a UE (e.g., the UEs 115, 215, and 400) to perform initial network access, cell selection, and/or fast cell reselection, as described in greater detail herein. For example, the broadcast system information may include SSBs, PSS, SSS, PBCH signals, MIB, and/or SIBs. Some example SIBs that may guide a UE in performing cell selection and/or reselection may include SIB2, SIB3, SIB4, and/or SIB5.

The network module 509 is configured to coordinate with a SWG, 5GC, and/or AMF within the core network to perform network attachment procedure, a TAU procedure, and/or a paging procedure with a UE.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115, 215, or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 500 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement RATs.

Figure 6:
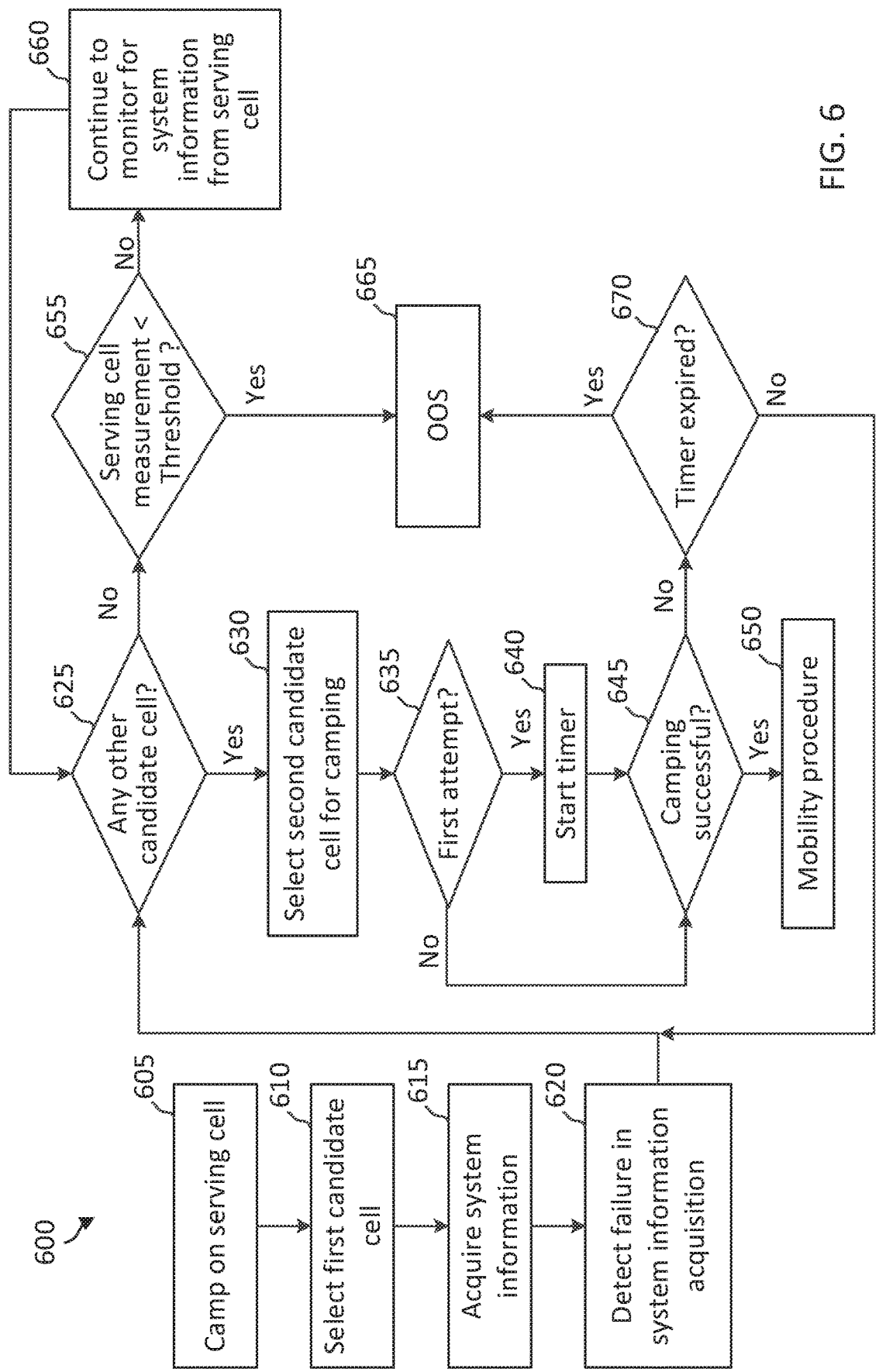
FIG. 6 is a flow diagram of a cell reselection method with increased user in-service time and improved idle mode mobility robustness according to some embodiments of the present disclosure.

FIG. 6 is a flow diagram of a cell reselection method 600 with increased user in-service time and improved idle mode mobility robustness according to some embodiments of the present disclosure. Steps of the method 600 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the network module 409, the transceiver 410, the modem 412, and the one or more antennas 416, to execute the steps of method 600. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 may be performed by a UE while in an RRC idle mode.

At step 605, the method 600 includes camping on a serving cell (e.g., the cell 210*a*). For example, the UE has previously performed an initial cell selection and network attachment using similar mechanisms as described in the method 300 and may have previously camped on one or more cells (e.g., the cells 210*b* and 210*c*). In other words, the UE had established a network session with the network and the UE's context is known to the network.

At step 610, the method 600 includes selecting a first candidate cell while camping on the serving cell. For example, the UE had acquired neighboring cell information from system information received from a previously camped cell or the current serving cell. The neighboring cell information may indicate a list of neighboring cells. The UE may make the assumption that a neighboring cell of a previously camped cell may also be a neighboring cell of the current serving cell. The UE may select the first candidate cell from the neighboring cells based on certain cell reselection criteria. For example, the UE selects the first candidate cell based on RSRPs and/or RSRQs of the serving cell and RSRPs and/or RSRQs of the first candidate cell and corresponding thresholds as described above in the method 300.

At step 615, after selecting the first candidate cell, the method 600 includes acquiring system information from the first candidate cell.

At step 620, the method 600 includes detecting a failure in system information acquisition. For example, the UE may fail to receive and/or decode certain critical system information. In the context of NR, the critical system information may be referred to as mandatory system information, such as MIB and SIB1. In some instances, the critical system information may also include SIB2.

At step 625, upon detecting a failure in system information acquisition (e.g., fail to receive a MIB or a certain SIB), the method 600 includes determining whether there is any other neighboring cell available. In an example, when the UE fails to receive information for intra-frequency neighboring cells, inter-frequency neighboring cells, and/or inter-RAT neighboring cells, the UE may monitor for intra-neighboring cells on the serving frequency. In addition, the UE may determine the available neighboring cells based on databases of neighboring cells collected from previous cell monitoring history and/or geographical location information of the UE. In other words, when detecting the system information acquisition failure, the UE aborts the cell reselection to the first candidate cell and searches for another neighboring cell suitable for camping irrespective of signal measurements of the first candidate cell. When determining that there is another candidate cell available, the method 600 proceeds to step 630.

At step 630, the method 600 includes selecting a second candidate cell from the available candidate cells for camping while continue to camp on the serving cell maintaining the network session. The selection of the second candidate cell may be different from conventional cell reselection criteria where the second candidate cell is required to have signal measurements (e.g., RSRP and/or RSRQ) higher than signal measurements of the serving cell by a certain threshold (e.g., s-IntraSearchQ, s-IntraSearchP, threshServingLowQ, and/or threshServingLowP in SIB2) for a duration longer than a certain threshold (e.g., t-Reselection in SIB2). The selection of the second candidate cell may be an immediate reselection without waiting for a t-Reselection time duration.

Mechanisms for reselecting the second candidate cell are described in greater detail herein.

At step 635, the method 600 includes determining whether the selection of the second candidate cell is a first attempt to reselect to another cell due to a failure in system acquisition for the first time after a last successful camping. When determining that the selection of the second candidate cell is a first attempt, the method 600 proceeds to step 640.

At step 640, the method 600 includes starting a timer. For example, the UE may configure the timer with a certain expiration duration to limit the amount of time the UE can attempt to reselect to another cell triggered by a system information acquisition failure before declaring an OOS. The expiration duration may vary depending on the embodiments. In some embodiments, the expiration duration may be about 10 seconds.

At step 645, the method 600 includes determining whether camping on the second candidate cell is successful. When determining that the camping on the second candidate cell is successful, method 600 proceeds to step 650. The determination of whether camping on the second system information is successful may include determining whether system information is successfully received and decoded from the second candidate cell.

At step 650, the method 600 includes performing an idle mode mobility procedure. In other words, the second candidate cell becomes the serving cell or source cell for the UE and the UE may repeat the mobility procedure to monitor and evaluate the new serving cell and neighboring cells (e.g., returning to step 605). In some examples, the UE may perform a fast or immediate cell reselection while camping on the new serving cell (e.g., the second candidate cell).

Returning to step 645, when the method 600 determines that camping on the second candidate is unsuccessful, the method 600 proceeds to step 670. At step 670, the method 600 determines whether the timer has expired. When determining that timer has expired, the method 600 proceeds to step 665. Otherwise, the method 600 returns to step 625 to repeat the cell reselection procedure until the timer expires or the UE successfully camps on a candidate cell.

At step 665, method 600 includes declaring an OOS error. For example, the UE may report an OOS error to a NAS layer and the NAS layer may in turn initiates an initial cell selection procedure at the UE.

Returning to step 635, when the method 600 determines that the selection of the second candidate cell is not a first attempt after a last successful camping to reselect to another cell due to a failure in system acquisition, the method 600 proceeds to step 645 to determine whether camping on the second candidate cell is successful.

Returning to step 625, when the method 600 determines that there is no candidate cell available, the method 600 proceeds to step 655. In other words, the serving cell is the only cell available and there is no neighboring cell currently available.

At step 655, the method 600 includes determining whether a serving cell measurement is below a threshold. In an example, the serving cell measurement may be an RSRQ measurement and the threshold may be similar to an s-IntraSearchQ threshold or a threshServingLowQ threshold or any suitable threshold. In an example, the serving cell measurement may be an RSRP measurement and the threshold may be similar to an s-IntraSearchP threshold or a threshServingLowP threshold or any suitable threshold. When determining that the serving cell measurement is below the threshold, the method 600 proceeds to step 665 to declare an OOS error. Upon declaring an OOS error, the UE may restart an initial cell selection procedure as described in the method 300 with respect to FIG. 3.

When determining that the serving cell measurement is not below the threshold, the method 600 proceeds to step 660. At step 660, the method 600 includes continuing to monitor for system information from the serving cell and returning to step 625 to repeat the cell reselection procedure until the timer expires or a successful camping on a candidate cell. For example, the UE may receive system information including neighboring cell information from the serving cell in the step 660 including additional neighboring cells.

In an example, the method 600 may additionally exclude a candidate cell from a subsequent cell selection or cell reselection if multiple system information decoding failures (e.g., about three failures) are detected from the candidate cell. The method 600 can identify the candidate cell based on a global cell ID (e.g., defined in a cellIdentity parameter in SIB1) of the candidate cell.

As can be observed from the method 600, upon detecting a failure to receive certain system information, a UE may perform a fast cell reselection to select a suitable cell to camp on instead of immediately declaring an OOS error (e.g., reporting to the upper layer) and restarting an initial cell selection (e.g., including scanning of frequency bands). Accordingly, the method 600 can increase a UE's in-service time and robustness for idle mode mobility.

Figure 7:
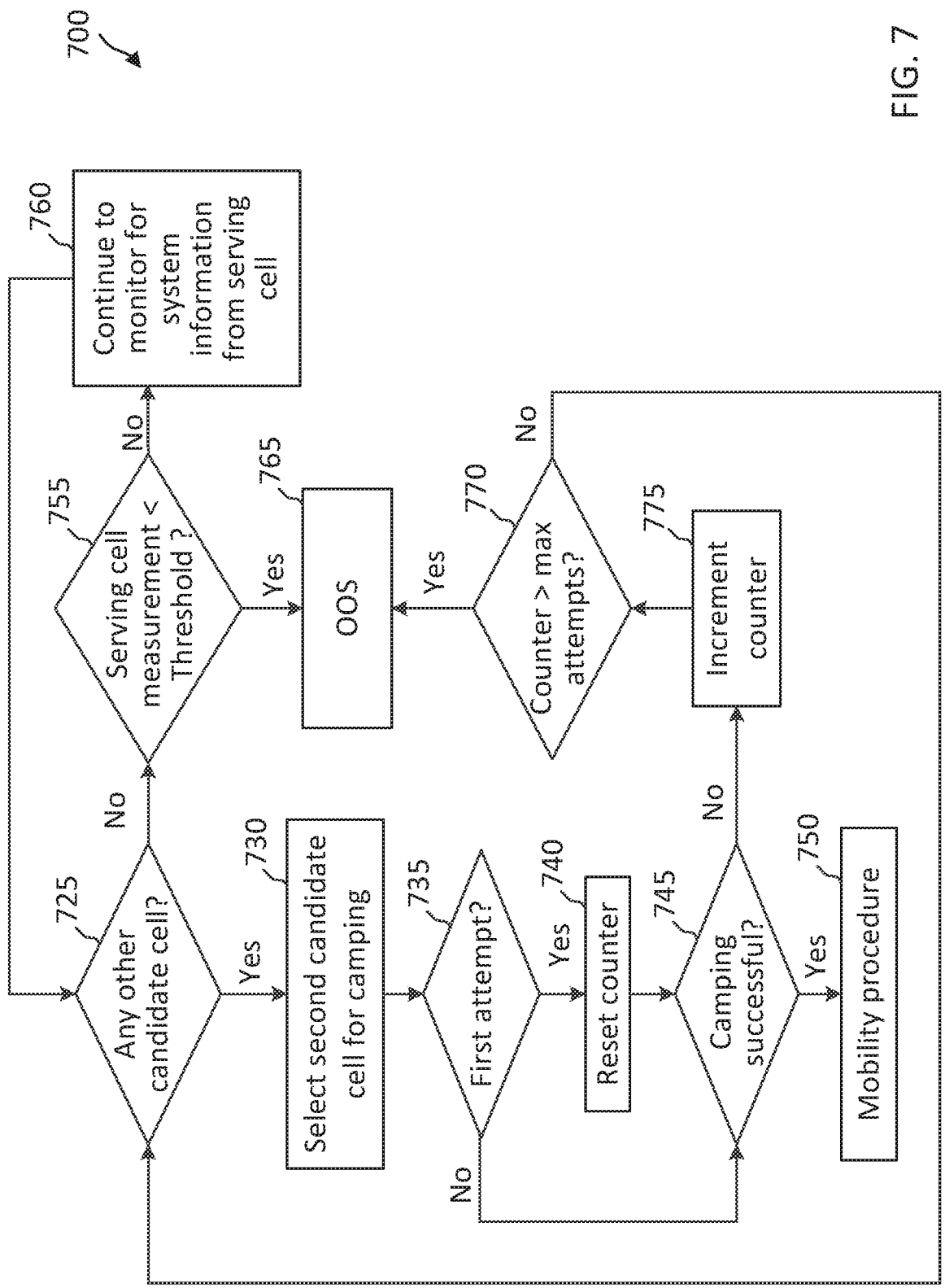
FIG. 7 is a flow diagram of a cell reselection method with increased user in-service time and improved idle mode mobility robustness according to some embodiments of the present disclosure.

FIG. 7 is a flow diagram of a cell reselection method 700 with increased user in-service time and improved idle mode mobility robustness according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the network module 409, the transceiver 410, the modem 412, and the one or more antennas 416, to execute the steps of method 700. As illustrated, the method 700 includes a number of enumerated steps, but embodiments of the method 700 may include additional steps before, after, and in between the enumerated steps. In some embodiments, one or more of the enumerated steps may be omitted or performed in a different order. The method 700 may be performed by a UE camping on a serving cell and failing to camp on a reselected cell (e.g., a first candidate cell). The method 700 may be substantially similar to the method 600, but may utilize a counter instead of a timer to limit a duration for retrying a fast cell reselection. For example, the method 700 may be suitable for use when a UE fails to receive less critical system information from the candidate cell. In the context of 5G or NR, less critical system information may be referred to as non-mandatory system information, which may include SIB3, SIB4, SIB5, and/or other SIBs that are not related to uplink and/or downlink channel configuration and/or access class information.

At step 725, the method 700 includes determining whether there is any other neighboring cell available while camping on a cell. When determining that there is another candidate cell available, the method 700 proceeds to step 730.

At step 730, the method 700 includes selecting a second candidate cell from the available candidate cells for camping while continue to camp on the serving cell maintaining the network session. The selection of the second candidate cell may be different from conventional cell reselection criteria as described above in the step 630 of the method 600.

At step 735, the method 700 includes determining whether the selection of the second candidate cell is a first attempt to reselect to another cell due to a failure in system acquisition for the first time after a last successful camping. When determining that the selection of the second candidate cell is a first attempt, the method 700 proceeds to step 740.

At step 740, the method 700 includes resetting a counter. For example, the UE may to limit the number of attempts that the UE may attempt to reselect to another cell triggered by a system information acquisition failure before declaring an OOS.

At step 745, the method 700 includes determining whether camping on the second candidate cell is successful. When determining that the camping on the second candidate cell is successful, method 700 proceeds to step 750. The determination of whether camping on the second system information is successful may include determining whether system information is successfully received and decoded from the second candidate cell.

At step 750, the method 700 includes performing an idle mode mobility procedure. In other words, the second candidate cell becomes the serving cell or source cell for the UE and the UE may repeat the mobility procedure to monitor and evaluate the new serving cell and neighboring cells. In some examples, the UE may perform a fast or immediate cell reselection while camping on the new serving cell (e.g., the second candidate cell).

Returning to step 745, when the method 700 determines that camping on the second candidate is unsuccessful, the method 700 proceeds to step 775. At step 775, the method 700 includes incrementing the counter.

At step 770, the method 700 determining whether the counter has exceeded a maximum number of allowable attempts for fast cell reselections. The maximum number of allowable attempts may vary depending on the embodiments. In some embodiments, the maximum number of allowable attempts may be about 3. When determining that the counter has reached the maximum number of allowable attempts for fast reselections, the method 700 proceeds to step 765. Otherwise, the method 700 returns to step 725 to repeat the cell reselection procedure until the counter reaches the maximum number of allowable attempts or a successful camping on a candidate cell At step 765, method 700 includes declaring an OOS error. For example, the UE may report an OOS error to a NAS layer and the NAS layer may in turn initiates an initial cell selection procedure at the UE.

Returning to step 735, when the method 700 determines that the selection of the second candidate cell is not a first attempt after a last successful camping to reselect to another cell due to a failure in system acquisition, the method 700 proceeds to step 745 to determine whether camping on the second candidate cell is successful.

Returning to step 725, when the method 700 determines that there is no candidate cell available, the method 700 proceeds to step 755. In other words, the serving cell is the only cell available and there is no neighboring cell currently available.

At step 755, the method 700 includes determining whether a serving cell measurement is below a threshold. In an example, the serving cell measurement may be an RSRQ measurement and the threshold may be similar to an s-IntraSearchQ threshold or a threshServingLowQ threshold or any suitable threshold. In an example, the serving cell measurement may be an RSRP measurement and the threshold may be similar to an s-IntraSearchP threshold or a threshServingLowP threshold or any suitable threshold. When determining that the serving cell measurement is below the threshold, the method 700 proceeds to step 765 to declare an OOS error. Upon declaring an OOS error, the UE may restart an initial cell selection procedure as described in the method 300 with respect to FIG. 3.

When determining that the serving cell measurement is not below the threshold, the method 700 proceeds to step 760. At step 760, the method 700 includes continuing to monitor for system information from the serving cell and returning to step 725 to repeat the cell reselection procedure until the counter reaches the maximum number of allowable attempts or a successful camping on a candidate cell. For example, the UE may receive system information including neighboring cell information from the serving cell in the step 760 including additional neighboring cells.

In an example, the method 700 may additionally exclude a candidate cell from a subsequent cell selection or cell reselection if multiple system information decoding failures (e.g., about three failures) are detected from the candidate cell. The method 700 can identify the candidate cell based on a global cell ID (e.g., defined in a cellIdentity parameter in SIB1) of the candidate cell.

As can be observed from the method 700, upon detecting a failure to receive certain system information, a UE may perform a fast cell reselection to select a suitable cell to camp on instead of immediately declaring an OOS error (e.g., reporting to the upper layer) and restarting an initial cell selection (e.g., including scanning of frequency bands). Accordingly, the method 700 can increase a UE's in-service time and robustness for idle mode mobility.

Figure 8:
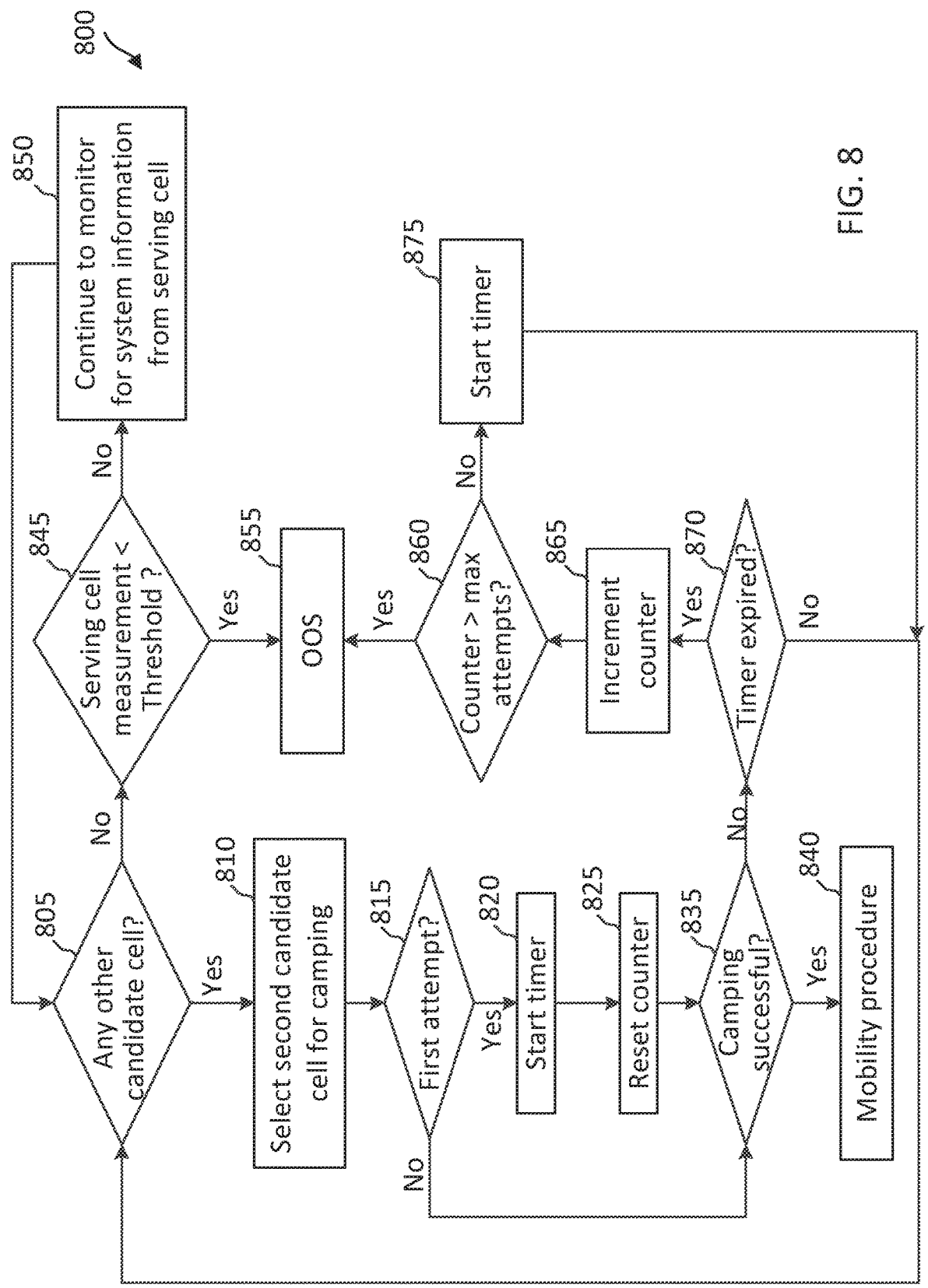
FIG. 8 is a flow diagram of a cell reselection method with increased user in-service time and improved idle mode mobility robustness according to some embodiments of the present disclosure.

FIG. 8 is a flow diagram of a cell reselection method 800 with increased user in-service time and improved idle mode mobility robustness according to some embodiments of the present disclosure. Steps of the method 800 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the network module 409, the transceiver 410, the modem 412, and the one or more antennas 416, to execute the steps of method 800. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 may be performed by a UE upon detecting a failure to receive certain system information while camping on a serving cell and attempting to reselect a candidate cell for camping. The method 800 may be substantially similar to the methods 600 and 700, but may utilize a combination of timer and counter to limit a duration for retrying a fast cell reselection. For example, the method 800 may be suitable for use when a UE fails to receive less critical system information from the candidate cell. In the context of 5G or NR, less critical system information may be referred to as non-mandatory system information, which may include SIB3, SIB4, SIB5, and/or other SIBs that are not related to uplink and/or downlink channel configuration and/or access class information.

At step 805, the method 800 includes determining whether there is any other candidate cell available while camping on a serving cell. When determining that there is another candidate cell available, the method 800 proceeds to step 810.

At step 810, the method 800 includes selecting a second candidate cell from the available candidate cells for camping, as described in greater detail herein.

At step 815, the method 800 includes determining whether the selection of the second candidate cell is a first attempt to reselect to another cell due to a failure in system acquisition after a last successful camping. When determining that the selection of the second candidate cell is a first attempt, the method 800 proceeds to step 820.

At step 820, the method 800 includes starting a timer. For example, the UE may configure the timer with a certain expiration duration to limit the amount of time the UE can attempt to reselect to another cell triggered by a system information acquisition failure. The expiration duration may vary depending on the embodiments. In some embodiments, the expiration duration may be about 10 seconds.

At step 825, the method 800 includes resetting a counter (e.g., to a value of 0).

At step 835, the method 800 includes determining whether camping on the second candidate cell is successful. When determining that the camping on the second candidate cell is successful, method 800 proceeds to step 840. The determination of whether camping on the second system information is successful may include determining whether system information is successfully received and decoded from the second candidate cell.

At step 840, the method 800 includes performing an idle mode mobility procedure. In other words, the second candidate cell became the serving cell or source cell for the UE and the UE may repeat the mobility procedure to monitor and evaluate the new serving cell and neighboring cells. In some examples, the UE may perform a fast or immediate cell reselection while camping on the new serving cell (e.g., the second candidate cell).

Returning to step 835, when the method 800 determines that camping on the second candidate is unsuccessful, the method 800 proceeds to step 870. At step 870, the method 800 determines whether the timer has expired. When determining that timer has expired, the method 800 proceeds to step 865. At step 865, the method 800 includes incrementing the counter.

At step 860, the method 800 includes determining whether the counter has exceeded a maximum number of allowable attempts for fast cell reselections. When determining that the counter has reached the maximum number of allowable attempts, the method 800 proceeds to step 855.

At step 855, method 800 includes declaring an OOS error. For example, the UE may report the OOS error to an upper layer (e.g. the NAS layer) and the upper layer may in turn initiate an initial cell selection procedure at the UE.

Returning to step 860, when determining that the counter has not exceeded the maximum allowable attempts, the method 800 proceeds to step 875. At step 855, the method 800 includes starting the timer (e.g., with another expiration duration of about 10 seconds). After the starting the timer, the method 800 proceeds to step 805 to repeat reselecting another candidate cell from the neighboring cells for camping.

Returning to step 870, when determining that the timer has not expired, the method 800 proceeds to step 805 to repeat reselecting another candidate cell from the neighboring cells for camping.

Returning to step 815, when the method 800 determines that the selection of the second candidate cell is not a first attempt for fast cell reselection after a last successful, the method 800 proceeds to step 835 to determine whether camping on the second candidate cell is successful.

Returning to step 805, when the method 800 determines that there is no other candidate cell available, the method 800 proceeds to step 845.

At step 845, the method 800 includes determining whether a serving cell measurement is below a threshold. Similar to the method 600, the serving cell measurement may be an RSRQ measurement and the threshold may be an s-IntraSearchQ threshold or a threshServingLowQ threshold. Alternatively, the serving cell measurement may be an RSRP measurement and the threshold may be s-IntraSearchP threshold or a threshServingLowP threshold. When determining that the serving cell measurement is below the threshold, the method 800 proceeds to step 855 to declare an OOS error. Upon declaring an OOS error, the UE may restart an initial cell selection procedure as described in the method 300 with respect to FIG. 3.

When determining that the serving cell measurement is not below the threshold, the method 800 proceeds to step 850. At step 850, the method 800 includes continuing to monitor for system information from the serving cell and returning to step 805 to repeat the cell reselection procedure until the timer expires or a successful camping on a candidate cell.

In an example, the method 800 may additionally exclude a candidate cell from a subsequent cell selection or cell reselection if multiple remaining SIB decoding failures (e.g., about three failures) are detected from the candidate cell. The remaining SIB s or non-critical SIBs may include any SIB other than SIB 1. The failures can be from the decoding of any of the remaining SIBs. The method 800 can identify the candidate cell based on a global cell ID (e.g., defined in a cellIdentity parameter in SIB1) of the candidate cell.

As can be observed, similar to the method 600, the method 800 allows a UE to perform a fast cell reselection upon detecting a failure to receive certain system information from a reselected candidate cell instead of immediately declaring an OOS error (e.g., reporting to the upper layer), which may trigger an initial cell selection (e.g., including scanning of frequency bands), or at least delay the declaring of the OOS error and the restarting of the initial cell selection. Accordingly, the method 800 can increase a UE's in-service time and robustness for idle mode mobility.

In general, a UE (e.g., a UE 115, 215 or 400) may utilize a combination of timer and counter, timer alone, or counter alone to limit the amount of time and/or the number of attempts the UE can perform a fast cell reselection before declaring an OOS error.

Figure 9:
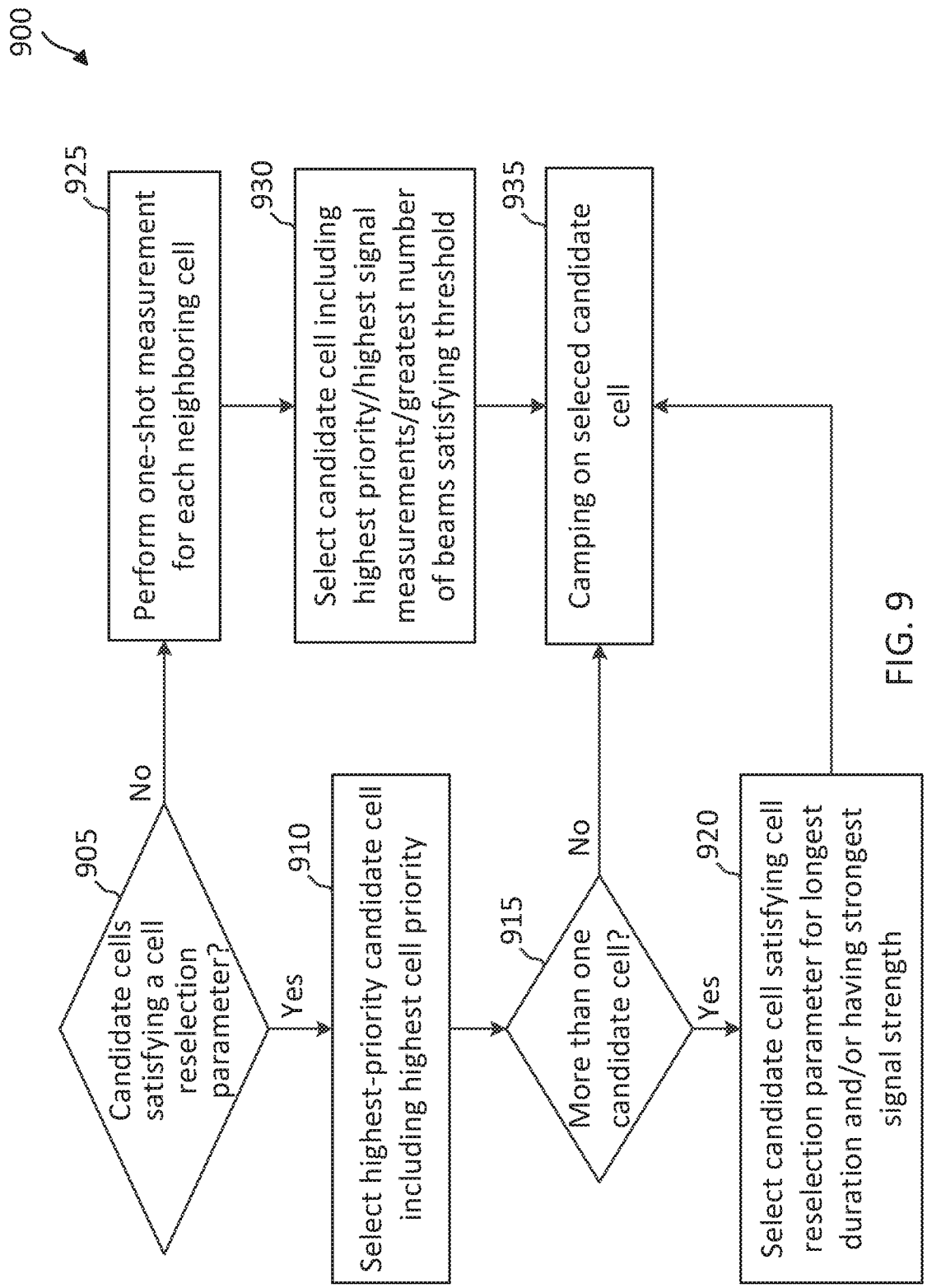
FIG. 9 is a flow diagram of a cell reselection method with increased user in-service time and improved idle mode mobility robustness according to some embodiments of the present disclosure.

FIG. 9 is a flow diagram of a cell reselection method 900 with increased user in-service time and improved idle mode mobility robustness according to some embodiments of the present disclosure. Steps of the method 900 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the network module 409, the transceiver 410, the modem 412, and the one or more antennas 416, to execute the steps of method 900. As illustrated, the method 900 includes a number of enumerated steps, but embodiments of the method 900 may include additional steps before, after, and in between the enumerated steps. In some embodiments, one or more of the enumerated steps may be omitted or performed in a different order. The method 900 may be performed by a UE upon detecting a failure to receive certain system information while camping on a serving cell and attempting to reselect a candidate cell for camping. In an example, a UE may perform the method 900 during step 630 of the method 600 described above with respect to FIG. 6, step 730 of the method 700 described above with respect to FIG. 7, or step 810 of the method 800 described above with respect to FIG. 8. For example, the UE is camped on a serving cell and reselected a first candidate cell for camping. However, the UE fails to receive certain system information from the reselected first candidate cell.

At step 905, the method 900 includes determining whether there is any candidate or neighboring cell satisfying a cell reselection parameter (e.g., RSRP and/or RSRQ thresholds) while camping on a serving cell. For example, the UE may be monitoring and evaluating one or more neighboring cells while camping on the serving cell prior to reselecting to camp on the first candidate cell. The UE may have determined that a subset of the neighboring cells have receive signal measurements (e.g., RSRP or RSRQ) higher than signal measurements (e.g., RSRP or RSRQ) of the serving cell for some time periods. In other words, the neighboring cells in the subset have receive signal measurements that are qualified for starting a cell reselection timer (e.g., with a t-Reselection expiration duration) for cell reselection evaluation. The UE may determine that the subset of neighboring cells satisfy the cell reselection parameter. When determining that there are one or more candidate cells satisfying the cell reselection parameter, the method 900 proceeds to step 910.

At step 910, the method 900 includes selecting a highest priority candidate cell from the qualified neighboring cells. In an example, the priorities of the neighboring cells are provided by a BS (e.g., the BS 105, 205, or 500) of the serving cell or a previously camped cell via broadcast system information. Cells operating on different frequencies and/or using different RATs may have different priorities. For example, the network may influence or encourage the UE to reselect to a certain cell over another cell by configuring a higher priority for the certain cell than the other cell.

At step 915, the method 900 includes determining whether there are more than one candidate cells (e.g., qualifying neighboring cells) including the same priority (e.g., the highest priority). When determining that there is only one candidate cell with the highest priority, the method 900 proceeds to step 935. At step 935, the method 900 includes camping on the reselected candidate cell (e.g., with the highest-priority).

Returning to step 915, when determining that there are more than one candidate cells including the same priority, the method 900 proceeds to step 920. At step 920, the method 900 includes selecting the candidate cell satisfying the cell reselection parameter for the longest duration (e.g., with the cell reselection timer running for the longest time) or the candidate cell having the strongest signal strength. In some instances, the method 900 may include a qualified cell with an expired cell reselection timer. The method 900 may proceed to step 935 to camp on the reselected candidate cell (satisfying the cell reselection parameter for the longest time).

Returning to step 905, when determining that there is no candidate cell satisfying the cell reselection parameter, the method 900 proceeds to step 925. At step 925, the method 900 performs a one-shot measurement for each neighboring cell on the same frequency and/or on different frequencies as the serving cell.

At step 930, after completing the one-shot measurements, the method 900 includes selecting a candidate cell with at least one of the highest priority, the highest signal measurements, or the greatest number of beams satisfying a certain threshold among the neighboring cells. For example, the UE may measure or determine an RSRP and/or an RSRQ for each cell at the time when the failure to receive system information occurs. The UE can determine an RSRP and/or an RSRQ for each cell in each beam direction. The UE selects the candidate cell based on the signal measurements and/or the cell priorities without starting a cell reselection timer. After selecting the candidate cell, the method 900 proceed to step 935 to camp on the selected candidate cell.

As can be observed, the method 900 selects a highest priority cell from neighboring or candidate cells that include valid RSRP or RSRQ measurements satisfying cell reselection criteria (e.g., to start a cell reselection timer). When there are multiple qualified cells with the same priority, the method 900 selects the cell with the highest signal strength among the multiple qualified cells. It should be noted that the method 900 selects the highest priority cell without having to wait for a certain duration (e.g., a timeout of the cell reselection timer) and without requiring the highest priority cell to include better signal measurements than the serving cell for the duration before the selection. Accordingly, the method 900 can provide a fast recovery to select to another serving cell within a short time period (e.g., a few seconds instead of tens of seconds as in a conventional recovery from OOS).

When there is no neighboring cell satisfying the cell reselection parameter, the method 900 performs a one-shot search and measurement on all neighboring cells available and reselect to the cell with the highest priority and the highest receive signal measurements (e.g., the highest RSRQ or the highest RSRP depending on whether threshServingLowQ or threshServingLowP is configured). The method 900 may perform the reselection without starting a cell reselection timer (based on the t-Reselection parameter configured by a SIB2). Accordingly, the method 900 can provide a fast recovery to reselect to another serving cell within a short time period (e.g., a few seconds instead of tens of seconds as in a conventional recovery from OOS). Additionally, if a rangeToBestCell parameter is defined for neighboring cells in the received system information, the method 900 reselects the cell with the highest priority and the greatest number of beams having signal strengths above a preconfigured threshold.

Figure 10:
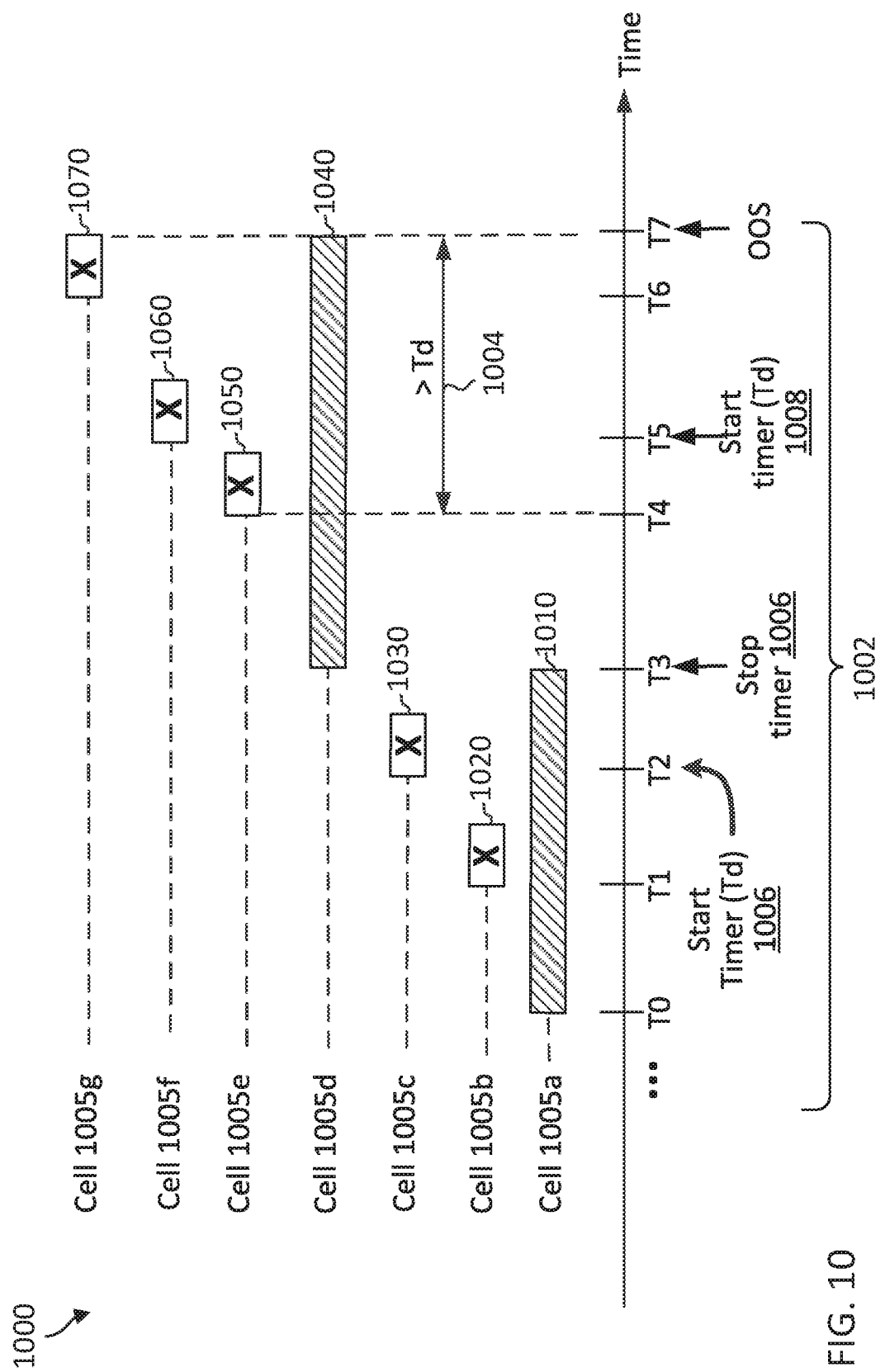
FIG. 10 is a time diagram illustrating a mobility scenario with fast cell reselections according to some embodiments of the present disclosure.

FIG. 10 is a time diagram illustrating a mobility scenario 1000 with fast cell reselections according to some embodiments of the present disclosure. The scenario 1000 may correspond to a mobility scenario of a UE, such as a UE 115, 215, or 400, in a network, such as the network 100 or 200. In FIG. 10, the x-axis represents time in some constant units. The patterned filled boxes represent a successful camping on a respective cell. The boxes marked with the symbol X represent a failure to camp on a respective cell due to a failure to receive certain system information (e.g., critical and/or non-critical system information). The network may include a plurality of cells 1005 similar to the cells 110 and 210. The cells 1005 are shown as cell 1005a, 1005b, 1005c, 1005d, 1005e, 1005f, and 1005g. In the scenario 1000, the UE may employ a suitable combination of the methods 300, 600, 700, 800, and 900 for cell selection, network attachment, and reselections.

At time T0, the UE has established a network session 1002 with the network and has successfully camped on the cell 1005a as shown by 1010, for example, using the method 300. The UE may evaluate receive signal strengths of the serving cell 1005a and one or more neighboring cells 1005 (e.g., the cells 1005b, 1005c, and 1005d) while camping on the cell 1005a.

At time T1, the UE detects that the receive signal strength of the serving cell 1005a falls below a certain threshold and requires a cell reselection, for example, due to the UE travelling away from the serving cell 1005a. For example, the UE detects that the neighboring cell 1005b meets certain cell reselection criteria. Thus, the UE selects the cell 1005b for camping. However, the UE fails to camp on the cell 1005b as shown by 1020 due to a failure to receive certain system information from the cell 1005b.

Upon detecting the system information reception failure, the UE selects another cell for a fast cell reselection instead of declaring an OOS. At time T2, the UE selects the cell 1005c for camping, for example, using the methods 600, 700, 800, and/or 900. The UE starts a timer 1006 with an expiration duration, denoted as Td (e.g., about 10 seconds) to avoid performing fast cell reselections indefinitely. As shown by 1030, the UE also fails to camp on the cell 1005c due to a failure to receive certain system information from the cell 1005c.

Upon detecting the system information reception failure, the UE checks that the timer 1006 has not expired. Thus, at time T3, the UE retries another fast or immediate cell reselection instead of declaring an OOS error. As shown by 1040, the UE selects the cell 1005d and successfully camps on to the cell 1005d. After camping on the cell 1005d successfully, the UE stops the timer 1006 and the cell 1005d becomes the serving cell for the UE. As shown, the UE maintains the network session 1002 while reselecting to the cells 1005b, 1005c, and 1005d.

The UE may evaluate receive signal strengths of the currently camped cell 1005d and neighboring cells 1005 (e.g., the cells 1005e, 1005f, and 1005g) while camping on the cell 1005d. At time T4, the UE detects that the receive signal strengths of the serving cell 1005d falls below a certain threshold and that the neighboring cell 1005e satisfies certain cell reselection criteria, for example, using the method 300. However, the UE fails to camp on the cell 1005e due to a failure to receive certain system information from the cell 1005e as shown by 1050.

Upon detecting the system information reception failure from the cell 1005e, the UE selects another cell for a fast cell reselection instead of declaring an OOS. At time T5, the UE selects the cell 1005f for camping, for example, using the methods 600, 700, 800, and/or 900. The UE starts a timer 1008 (e.g., with an expiration duration, denoted as Td, of about 10 seconds) to avoid performing fast reselections indefinitely. The UE also fails to camp on the cell 1005f due to a failure to receive certain system information from the cell 1005f as shown by 1060.

At time T6, the UE determines that the timer 1008 has not expired and retries the fast or immediate cell reselection to select to the cell 1005g instead of declaring an OOS. Again, the UE fails to camp on the cell 1005g due to a failure to receive certain system information from the cell 1005g as shown by 1070.

At time T7, the UE determines that the timer 1008 has expired (e.g., the duration 1004 exceeds the duration Td). Thus, the UE declares an OOS error, for example, by reporting to an upper layer, such as a NAS layer. The network session 1002 may terminate upon the OOS error. The upper layer may in turn trigger the UE to perform an initial cell selection and establish a new network session.

Figure 11:
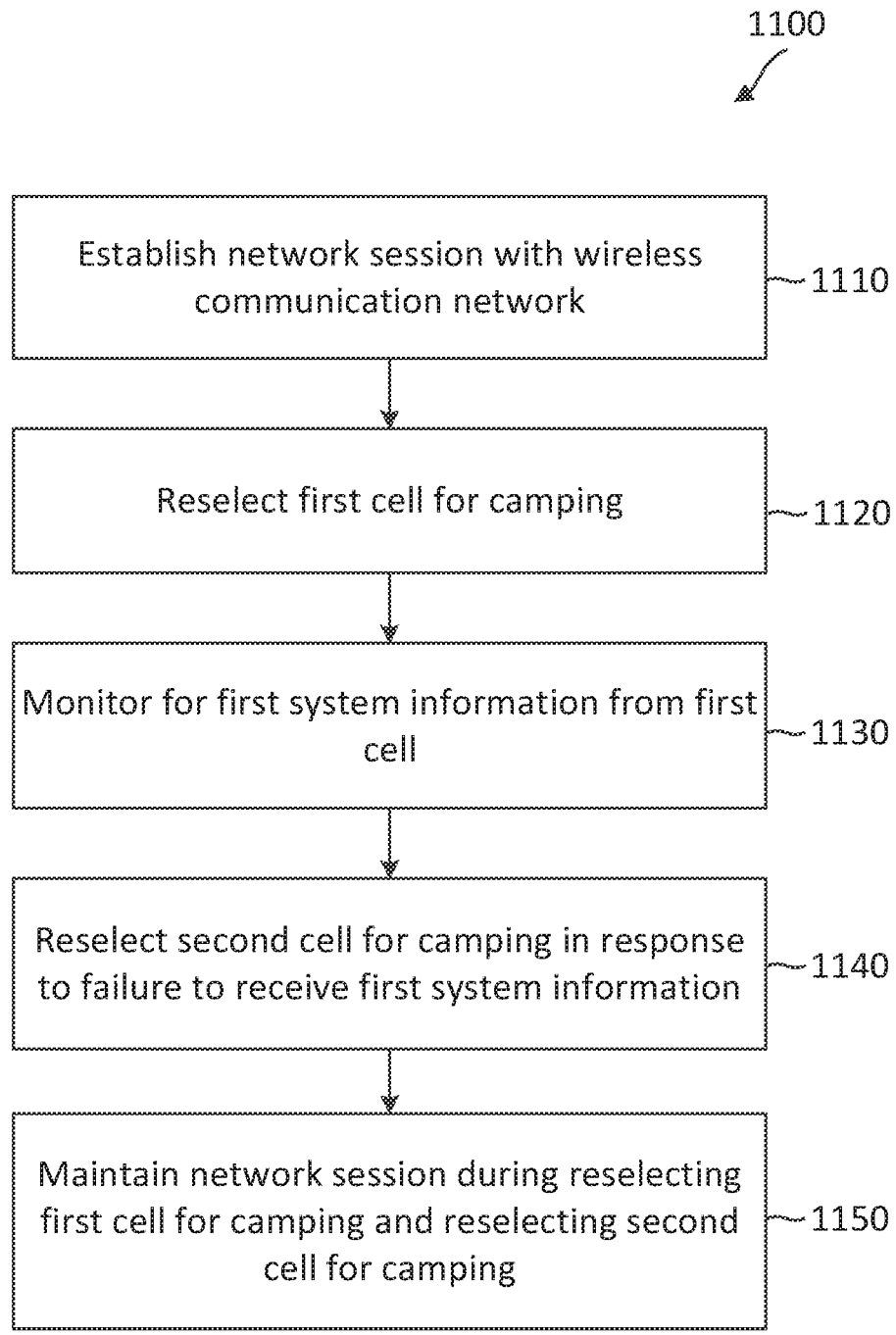
FIG. 11 is a flow diagram of a cell reselection method with increased user in-service time and improved idle mode mobility robustness according to some embodiments of the present disclosure.

FIG. 11 is a flow diagram of a cell reselection method 1100 with increased user in-service time and improved idle mode mobility robustness with increased user in-service time and improved idle mode mobility robustness according to some embodiments of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115, UE 215, or UE 400, may utilize one or more components, such as the processor 402, the memory 404, the cell selection module 408, the network module 409, the transceiver 410, the modem 412, and the one or more antennas 416, to execute the steps of method 1100. The method 1100 may employ similar mechanisms as in the methods 300, 600,700, 800, and 900 described with respect to FIGS. 3, 6, 7, 8, and 9, respectively, and/or the scenario 1000 as described with respect to FIG. 10. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes establishing, by a wireless communication device, a network session (e.g., the network session 1002) with a wireless communication network (e.g., the network 100 or 200).

At step 1120, the method 1100 includes reselecting, by the wireless communication device, a first cell (e.g., the cell 110, 210, or 1005) for camping. The first cell is associated with the wireless communication network.

At step 1130, the method 1100 includes monitoring, by the wireless communication device, for first system information from the first cell. In an example, the first system information may include critical system information, such as MIB, SIB1, and/or SIB2. In an example, the first system information may include less critical system information, such as SIB2, SIB3, SIB4, SIB5, and other remaining SIBs.

At step 1140, the method 1100 includes reselecting, by the wireless communication device, a second cell (e.g., the cell 110, 210, or 1005) for camping in response to a failure to receive the first system information. The second cell is associated with the wireless communication network and different from the first cell.

At step 1150, the method 1100 includes maintaining, by the wireless communication device, the network session during the selecting.

In an embodiment, the wireless communication device monitors one or more frequencies for cell information, the one or more frequencies including a first frequency associated with the first cell. The reselection of the second cell includes selecting the second cell from one or more neighboring cells identified from the monitoring the one or more frequencies for the cell information, the one or more neighboring cells including the second cell.

In an embodiment, the reselection of the second cell includes determining, by the wireless communication device, that a subset of the one more neighboring cells include signal measurements satisfying a cell reselection parameter. The cell reselection parameter can include one or more signal measurement thresholds for determining whether a cell is qualified to be monitored and evaluated for a cell reselection, where a cell reselection timer can be started for the evaluation (e.g., based on a t-Reselection parameter in SIB2). The reselection of the second cell includes selecting the second cell from among the subset of the one more neighboring cells based on cell priority information associated with the one or more neighboring cells. For example, the wireless communication device selects the second cell with the highest priority among the one more neighboring cells.

In an embodiment, the reselection of the second cell further includes selecting the second cell from among the subset of one or more neighboring cells based on at least one of the signal measurements or a duration of the signal measurements satisfying the cell reselection parameter. For example, when there are multiple neighboring cells with the same priority, the wireless communication device selects the second cell with signal measurements better than signal measurements of the first cell for a longest duration among the multiple cells. In an embodiment, the wireless communication device performs signal measurements for the one or more neighboring cells in response to a failure to receive the first system information. The reselection of the second cell includes selecting the second cell from among the one or more neighboring cells based on at least one of a cell priority or a signal measurement. For example, the wireless communication device selects the second cell with the highest priority and/or the highest signal measurement among the one more neighboring cells.

In an embodiment, the performing can further include performing the signal measurements for the one or more neighboring cells in a plurality of beam directions. The selection of the second cell includes selecting the second cell from among the one or more neighboring cells based on a number of beams with signal measurements exceeding a threshold in the plurality of beam directions. For example, the wireless communication device can select the cell including the largest number of beams with signal measurements above a certain threshold. In an embodiment, the wireless communication device performs the measurements in response to a determination that the one or more neighboring cells fail to satisfy a cell reselection parameter.

In an embodiment, the reselection of the second cell is further based on at least one of a number of cell reselection attempts or a cell reselection duration not being exceeded. For example, the wireless communication device can utilize a timer and/or a counter to limit the amount of the time the wireless communication device can spent on the fast reselection.

In an embodiment, the wireless communication device monitors for second system information from the second cell in response to the selection of the second cell. In an embodiment, the wireless communication device reports an 00S error for the network session in response to determining that at least one of the number of cell selection attempts or the cell selection duration has been exceeded.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    establishing, by a wireless communication device, a network session with a wireless communication network;
    reselecting, by the wireless communication device, a first cell for camping, wherein the first cell is associated with the wireless communication network;
    monitoring, by the wireless communication device, for first system information from the first cell;
    reselecting, by the wireless communication device, a second cell for camping in response to a failure to receive the first system information, wherein the second cell is associated with the wireless communication network and different from the first cell; and
    maintaining, by the wireless communication device, the network session during the reselecting the first cell for camping and the reselecting the second cell for camping.

2. The method of claim 1, further comprising:
    monitoring, by the wireless communication device, one or more frequencies for cell information, the one or more frequencies including a first frequency associated with the first cell.

3. The method of claim 2, wherein the reselecting the second cell includes:
    identifying, by the wireless communication device, one or more neighboring cells based on the monitoring the one or more frequencies for the cell information, the one or more neighboring cells including the second cell.

4. The method of claim 3, wherein the reselecting the second cell includes:
    determining, by the wireless communication device, that a subset of the one or more neighboring cells include signal measurements satisfying a cell reselection parameter; and
    selecting, by the wireless communication device, the second cell from among the subset of the one or more neighboring cells based on cell priority information associated with the one or more neighboring cells.

5. The method of claim 4, wherein the reselecting the second cell includes:
    selecting, by the wireless communication device, the second cell from among the subset of the one or more neighboring cells based on at least one of the signal measurements or a duration of the signal measurements satisfying the cell reselection parameter.

6. The method of claim 3, further comprising:
    performing, by the wireless communication device, signal measurements for the one or more neighboring cells in response to a failure to receive the first system information,
    wherein the reselecting the second cell includes:
        selecting, by the wireless communication device, the second cell from among the one or more neighboring cells based on at least one of a cell priority or a signal measurement.

7. The method of claim 6, wherein:
    the performing includes:
        performing, by the wireless communication device, the signal measurements for the one or more neighboring cells in a plurality of beam directions, and
    the reselecting the second cell includes:
        selecting the second cell from among the one or more neighboring cells based on a number of beams with signal measurements exceeding a threshold in the plurality of beam directions.

8. The method of claim 6, further comprising:
    determining, by the wireless communication device, that the one or more neighboring cells fail to satisfy a cell reselection parameter,
    wherein the performing is in response to the determining.

9. The method of claim 1, wherein the reselecting the second cell is further based on at least one of a number of cell reselection attempts or a cell reselection duration not being exceeded.

10. The method of claim 1, further comprising:
    monitoring, by the wireless communication device, for second system information from the second cell in response to the reselecting the second cell.

11. The method of claim 1, further comprising:
    reporting, by the wireless communication device, an out-of-service error for the network session in response to determining that at least one of a number of cell reselection attempts or a cell reselection duration has been exceeded.

12. An apparatus comprising:
    a processor configured to:
        establish a network session with a wireless communication network;
        reselect a first cell for camping, wherein the first cell is associated with the wireless communication network;
        monitor for first system information from the first cell;
        reselect a second cell for camping in response to a failure to receive the first system information, wherein the second cell is associated with the wireless communication network and different from the first cell; and maintain the network session during the reselecting the first cell for camping and the reselecting the second cell for camping.

13. The apparatus of claim 12, wherein the processor is further configured to:

monitor one or more frequencies for cell information, the one or more frequencies including a first frequency associated with the first cell.

14. The apparatus of claim 13, wherein the processor configured to reselect the second cell is further configured to:

identify one or more neighboring cells based on the monitoring the one or more frequencies for the cell information, the one or more neighboring cells including the second cell.

15. The apparatus of claim 14, wherein the processor configured to reselect the second cell is further configured to:

determine that a subset of the one or more neighboring cells include signal measurements satisfying a cell reselection parameter; and select the second cell from among the subset of the one or more neighboring cells based on cell priority information associated with the one or more neighboring cells.

16. The apparatus of claim 15, wherein the processor configured to reselect the second cell is further configured to:

select the second cell from among the subset of the one or more neighboring cells based on at least one of the signal measurements or a duration of the signal measurements satisfying the cell reselection parameter.

17. The apparatus of claim 14, wherein:

the processor is further configured to:

perform signal measurements for the one or more neighboring cells in response to a failure to receive the first system information, and the processor configured to reselect the second cell is further configured to:

select the second cell from among the one or more neighboring cells based on at least one of a cell priority or a signal measurement.

18. The apparatus of claim 17, wherein:

the processor configured to perform the signal measurements is further configured to:

perform the signal measurements for the one or more neighboring cells in a plurality of beam directions, and the processor configured to reselect the second cell is further configured to:

select the second cell from among the one or more neighboring cells based on a number of beams with signal measurements exceeding a threshold in the plurality of beam directions.

19. The apparatus of claim 17, wherein:

the processor is further configured to:

determine that the one or more neighboring cells fail to satisfy a cell reselection parameter, and the processor configured to perform the signal measurements is further configured to:

perform the signal measurements in response to the determining that the one or more neighboring cells fail to satisfy a cell reselection parameter.

20. The apparatus of claim 12, wherein the processor configured to reselect the second cell is further configured to:

reselect the second cell further based on at least one of a number of cell reselection attempts or a cell reselection duration not being exceeded.

21. The apparatus of claim 12, wherein the processor is further configured to:

report an out-of-service error for the network session in response to determining that at least one of a number of cell reselection attempts or a cell reselection duration has been exceeded.

22. A non-transitory computer-readable medium having program code recorded thereon, the program code comprising:

code for causing a wireless communication device to establish a network session with a wireless communication network;

code for causing the wireless communication device to reselect a first cell for camping, wherein the first cell is associated with the wireless communication network;

code for causing the wireless communication device to monitor for first system information from the first cell;

code for causing the wireless communication device to reselect a second cell for camping in response to a failure to receive the first system information, wherein the second cell is associated with the wireless communication network and different from the first cell; and code for causing the wireless communication device to maintain the network session during the reselecting the first cell for camping and the reselecting the second cell for camping.

23. The non-transitory computer-readable medium of claim 22, further comprising:

code for causing the wireless communication device to monitor one or more frequencies for cell information, the one or more frequencies including a first frequency associated with the first cell.

24. The non-transitory computer-readable medium of claim 23, wherein the code for causing the wireless communication device to reselect the second cell is further configured to:

identify one or more neighboring cells based on the monitoring the one or more frequencies for the cell information, the one or more neighboring cells including the second cell.

25. The non-transitory computer-readable medium of claim 24, wherein the code for causing the wireless communication device to reselect the second cell is further configured to:

determine that a subset of the one or more neighboring cells include signal measurements satisfying a cell reselection parameter; and select the second cell from among the subset of the one or more neighboring cells based on at least one of cell priority information associated with the one or more neighboring cells, the signal measurements, or a duration of the signal measurements satisfying the cell reselection parameter.

26. The non-transitory computer-readable medium of claim 24, further comprising:

code for causing the wireless communication device to perform signal measurements for the one or more neighboring cells in response to a failure to receive the first system information, wherein the code for causing the wireless communication device to reselect the second cell is further configured to:
  select the second cell from among the one or more neighboring cells based on at least one of a cell priority or a signal measurement.

27. The non-transitory computer-readable medium of claim 26, wherein:
the code for causing the wireless communication device to perform the signal measurements is further configured to:
  perform the signal measurements for the one or more neighboring cells in a plurality of beam directions, and
the code for causing the wireless communication device to reselect the second cell is further configured to:
  select the second cell from among the one or more neighboring cells based on a number of beams with signal measurements exceeding a threshold in the plurality of beam directions.

28. The non-transitory computer-readable medium of claim 26, further comprising:
  code for causing the wireless communication device to determine that the one or more neighboring cells fail to satisfy a cell reselection parameter,
wherein the code for causing the wireless communication device to perform the signal measurements is further configured to perform the signal measurements is in response to the determining that the one or more neighboring cells fail to satisfy a cell reselection parameter.

29. The non-transitory computer-readable medium of claim 22, wherein the code for causing the wireless communication device to reselect the second cell is further configured to reselect the second cell based on at least one of a number of cell reselection attempts or a cell reselection duration not being exceeded.

30. The non-transitory computer-readable medium of claim 22, further comprising:
  code for causing the wireless communication device to report an out-of-service error for the network session in response to determining that at least one of a number of cell reselection attempts or a cell reselection duration has been exceeded.

* * * * *

UNITED STATES PATENT AND TRADEMARK OFFICE
CERTIFICATE OF CORRECTION

PATENT NO. : 11,044,647 B2
APPLICATION NO. : 16/374596
DATED : June 22, 2021
INVENTOR(S) : Shanshan Wang et al.

It is certified that error appears in the above-identified patent and that said Letters Patent is hereby corrected as shown below:

In the Claims

Claim 4, Column 32, Line 3, change "determining, by the wireless communication device, that" to --determining, by the wireless communication device, that signal measurements of--.

Claim 4, Column 32, Lines 4-5, change "include signal measurements satisfying" to --satisfy--.

Claim 15, Column 33, Lines 22-23, change "determine that a subset of the one or more neighboring cells include signal measurements satisfying" to --determine that signal measurements of a subset of the one or more neighboring cells satisfy--.

Claim 25, Column 34, Lines 51-52, change "determine that a subset of the one or more neighboring cells include signal measurements satisfying" to --determine that signal measurements of a subset of the one or more neighboring cells satisfy--.

Signed and Sealed this
Twenty-fourth Day of June, 2025

Coke Morgan Stewart
*Acting Director of the United States Patent and Trademark Office*